(12) United States Patent
Kondo

(10) Patent No.: US 6,335,988 B1
(45) Date of Patent: *Jan. 1, 2002

(54) METHOD AND APPARATUS FOR SEPARATING/GENERATING BACKGROUND AND MOTION OBJECT PLANES

(75) Inventor: Tetsujiro Kondo, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 11 days.

(21) Appl. No.: 08/904,930

(22) Filed: Aug. 1, 1997

Related U.S. Application Data

(63) Continuation of application No. 08/748,024, filed on Nov. 12, 1996, now Pat. No. 5,706,367, which is a continuation of application No. 08/272,314, filed on Jul. 8, 1994, now abandoned.

(30) Foreign Application Priority Data

| Jul. 12, 1993 | (JP) | 5-195214 |
| Jul. 23, 1993 | (JP) | 5-202856 |
| Jul. 27, 1993 | (JP) | 5-204505 |
| Jul. 29, 1993 | (JP) | 5-207301 |
| Aug. 10, 1993 | (JP) | 5-218080 |

(51) Int. Cl.$^7$ ................................................. G06K 9/36
(52) U.S. Cl. ........................................ 382/236; 348/409.1
(58) Field of Search ...................... 382/107, 236, 382/302, 283, 103; 348/415, 452, 416.1, 409.1

(56) References Cited

U.S. PATENT DOCUMENTS

| 4,645,459 A | * | 2/1987 | Graf et al. | 434/43 |
| 4,717,957 A | * | 1/1988 | Santamaki et al. | 348/415 |
| 4,841,575 A | * | 6/1989 | Welsh et al. | 704/260 |
| 5,122,873 A | * | 6/1992 | Golin | 358/133 |
| 5,157,732 A | * | 10/1992 | Ishii et al. | 382/107 |
| 5,267,334 A | * | 11/1993 | Normille et al. | 382/236 |
| 5,301,240 A | * | 4/1994 | Stockum et al. | 382/100 |
| 5,305,400 A | * | 4/1994 | Butera | 382/107 |
| 5,343,248 A | * | 8/1994 | Fujinami | 348/452 |
| 5,510,838 A | * | 4/1996 | Yomdin et al. | 348/384 |
| 5,548,659 A | * | 8/1996 | Okamoto | 382/107 |
| 5,684,886 A | * | 11/1997 | Kamada et al. | 382/107 |
| 5,732,146 A | * | 3/1998 | Yamada et al. | 382/107 |
| 5,751,831 A | * | 5/1998 | Ono | 382/107 |
| 5,774,592 A | * | 6/1998 | Takeuchi et al. | 382/107 |

* cited by examiner

*Primary Examiner*—Jayanti K. Patel
(74) *Attorney, Agent, or Firm*—Frommer Lawrence & Haug LLP.; William S. Frommer; Dexter T. Chang

(57) ABSTRACT

A transmitter which allows to reproduce a high quality and smooth dynamic image on the receiving side even with a transmission medium having a low transmission rate is provided. Background plane data representing a still image of a background image of video and one or more motion plane data representing still images of each of moving objects moving on the background image are separated from input digital video signal. The separated background plane data and each motion plane data are stored individually in memories 23BG and 23A1 through 23An. Change data on the still images stored as the motion plane data is detected based on the input digital video signal and output of the memories 23BG and 23A1 through 23An to compress and code it by a coding means 26. Still image data of the plurality of plane data of the memory means 23BG and 23A1 through 23An and the change information from the coding means 26 are transmitted.

92 Claims, 20 Drawing Sheets

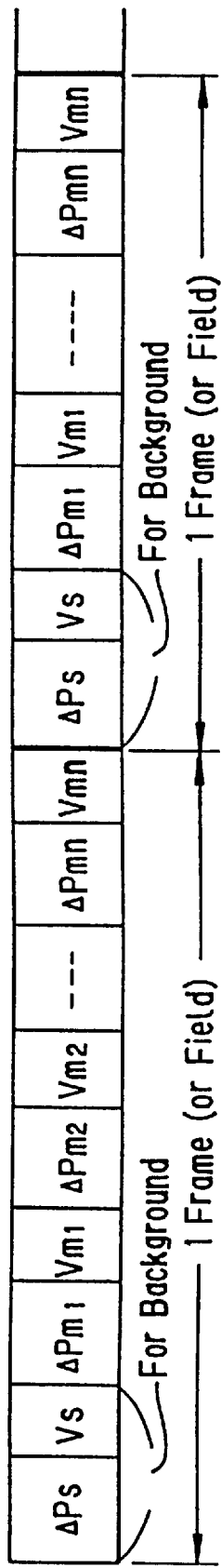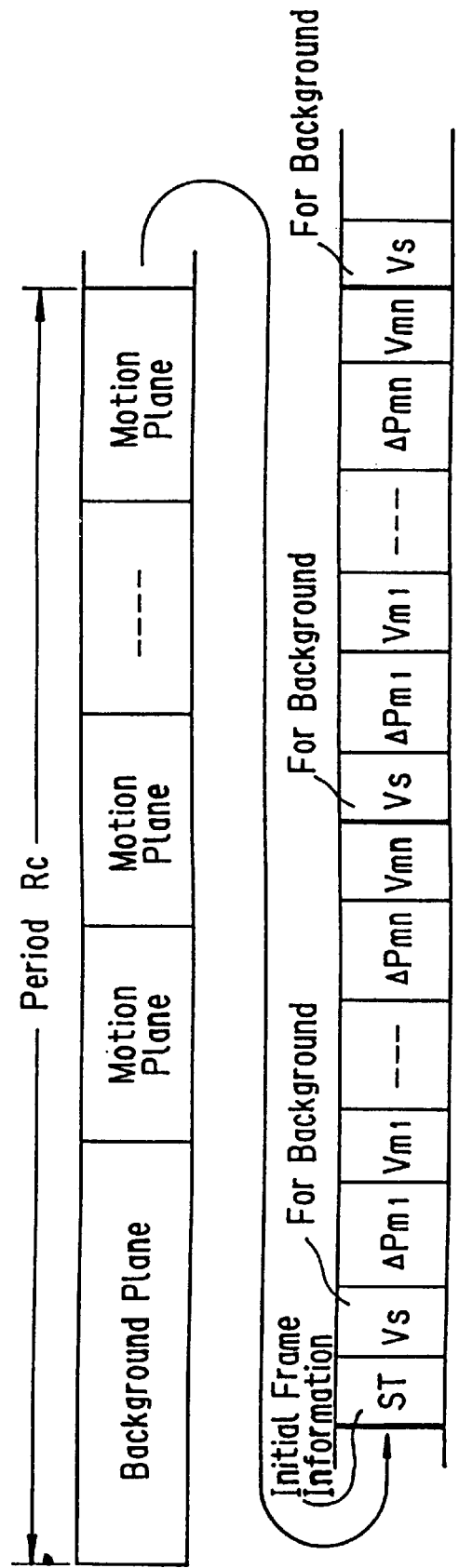

METHOD AND APPARATUS FOR SEPARATING/GENERATING BACKGROUND AND MOTION OBJECT PLANES

This application is a continuation application Ser. No. 08/748,024, filed Nov. 12, 1996, now U.S. Pat. No. 5,706,367 which is in turn a Continuation of Ser. No. 08/272,314 filed Jul. 8, 1994, now abandoned.

BACKGROUND OF THE INVENTION

1. Field of the Invention

The present invention relates to a transmitter and receiver of digital video signal capable of transmitting at a low bit rate.

2. Description of the Related Art

Digital video data of a dynamic image contains a very large amount of information and a transmission bit rate becomes very high if it is transmitted as it is. Due to that, conventionally data is compressed taking an advantage that generally an image is information of time and space when it is transmitted using a low rate transmission medium whose transmission bit rate is limited in a same manner as digital video data is recorded or reproduced using a magnetic tape or magneto-optic disk.

The compression and transmission of digital video signal have been conventionally carried out for example by taking a difference between frames of digital video data and by data compressing the difference using DCT, (discrete cosign transform). Further, considering that there are less motions in video, data is transmitted culling out its amount in a TV conference by transmitting data of only single side field, not transmitting,full frames.

Although the image may become fine by victimizing time data and by assuring space data by reducing a number of fields to be transmitted, not transmitting the single side fields, the motion may become awkward.

However, because a quality of the dynamic image is lost if the motion is awkward, a method of transmitting a full frame by compressing image data per one frame as much as possible to be able to reproduce a full motion as a dynamic image is being considered.

As described above, the conventional method for transmitting digital video signal is devised so that the transmission rate is lowered by compressing video data in the time direction or spatial direction.

However, if the transmission bit rate is to be lowered just by compressing data, i.e. by compressing in the time direction for example, a motion of the dynamic image becomes awkward and an unnatural video is brought about. Further, if data is compressed in the spatial direction, the spatial resolution is degraded that much, degrading the reproduced video.

That is, because the conventional method lowers the bit rate just by compressing data, it victimizes either or both data in the time direction and spatial direction, disallowing to obtain a satisfactory reproduced video.

Accordingly, it is an object of the present invention to provide a transmitter and receiver for digital video signal devised to be able to obtain a beautiful reproduced video as much as possible and in the same time, to render the motion smooth.

SUMMARY OF THE INVENTION

In order to solve the aforementioned problems, a transmitter for transmitting digital video signal of the present invention comprises (the reference numerals designated in the preferred embodiments described later are given here);

separating means 22 for separating an input digital video signal into background plane data representing a still image of a background image composing a screen image thereof and one or more motion plane data representing a still image of each moving object moving on the background image;

memory means 23BG and 23A1 through 23An for individually storing the separated background plane data and each motion plane data;

change information detecting means 22 for detecting information on changes of the still image stored as the motion plane data based on the input digital video signal and output of the memory means;

coding means 26 for compressing and coding an output of the change information detecting means; and transmitting means for transmitting the still image data of the plurality of plane data in the memory means and the change information from the coding means.

According to the present invention constructed as described above, one scene composed of specific video contents for example may be recognized as a background image which can be considered as a stationary still image and one or more moving objects having different-motions.

That is, a 2-D image of one frame of a dynamic image is understood as a superposition of 2-D planes composed of each still image representative of the background and the plurality of moving objects. For the moving objects, information on changes of the moving object such as a moving direction, moving distance, deformation and the like are extracted. Then the change information on the motion plane is transmitted together with the background image plane and motion planes as dynamic image data.

At the receiver side, the dynamic image is reproduced by superpositioning the moving objects in the motion planes on the background image in the background plane corresponding to the change information.

In this case, each of the background plane and motion planes of the moving objects is one still image and data on the still image just needs to be transmitted at the very beginning of one scene. Because just each one still image needs to be transmitted for one scene of more than several seconds, a large amount of data may be transmitted even in a low transmission rate, thereby enhancing the image quality. Further, because the change information needs to be several bits at most, it can be transmitted on real-time with enough margin even in a remaining time after transmitting the still image data in one scene.

The above and other advantages of the present invention will become more apparent in the following description and the accompanying drawings in which like reference numerals refer to like parts.

BRIEF DESCRIPTION OF THE DRAWINGS

FIG. 25 is a drawing for explaining a signal recording timing of the present invention.

DETAILED DESCRIPTION OF PREFERRED EMBODIMENT

Figure 1:
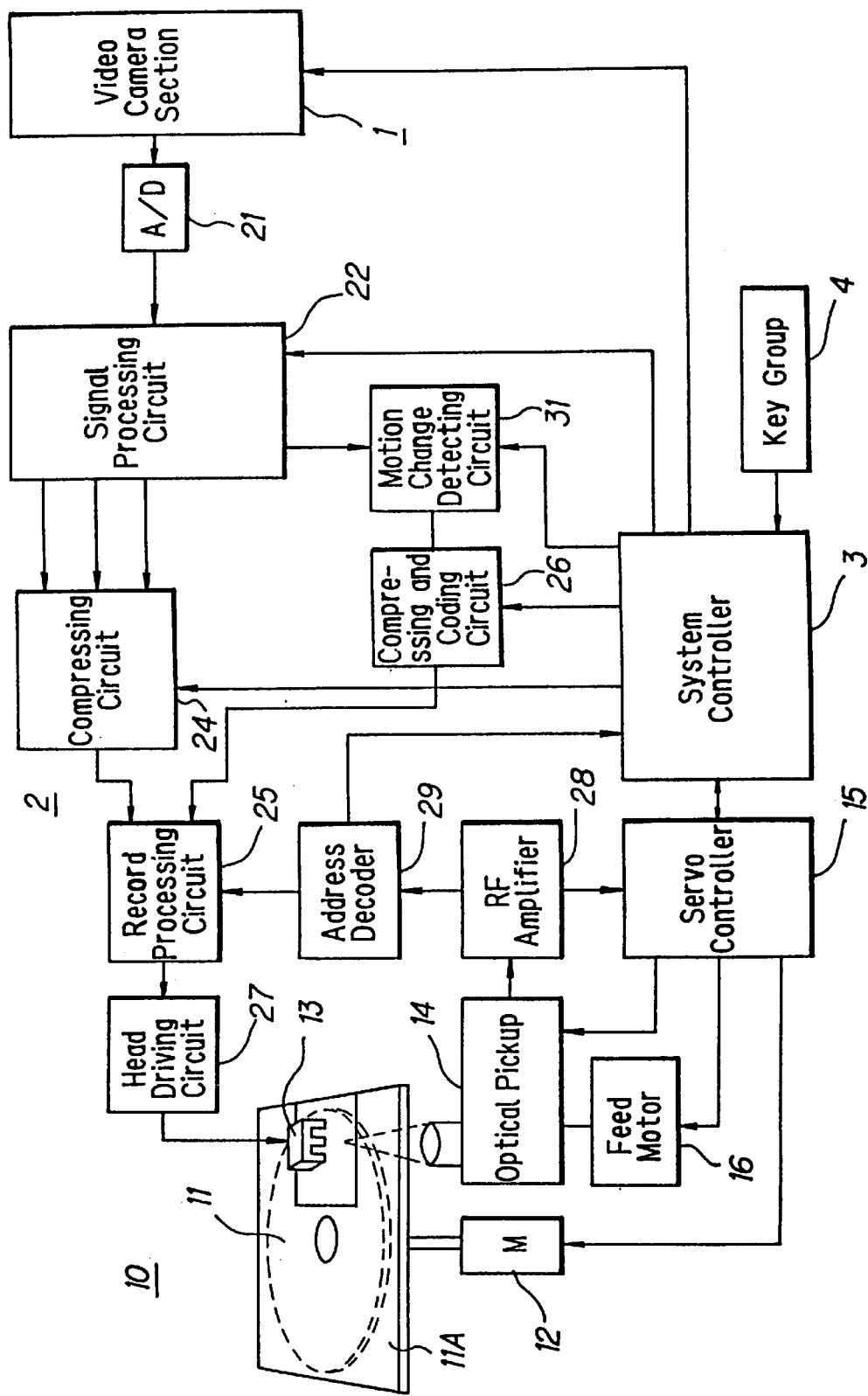
FIG. 1 is a block diagram of a disk recording unit as one embodiment of a digital video signal transmitter of the present invention.

Referring now to the drawings, one embodiment of a transmitter of digital video signal of the present invention will be explained for a case when it is applied to a disk unit using an magneto-optic disk as a recording medium.

The embodiment of a transmitter and receiver of digital video signal of the present invention will be explained below exemplifying a case of an unit for recording/reproducing digital video signal on/from an magneto-optic disk.

FIG. 1 shows a disk driving system of the exemplified unit and its block diagram, wherein the unit comprises a video camera section 1, signal recording system 2, system controller 3 for controlling the whole system and disk driving system 10 and is arranged so that a video output signal of the video camera section 1 is recorded via the signal recording system 2.

In the disk driving system 10, the reference numeral (11) denotes a magneto-optic disk. This magneto-optic disk 11 is stored in a cartridge 11A. Pregrooves for tracking control are created on the disk 11 beforehand and absolute address data is recorded on the pregrooves by superimposing with wobbling signals for tracking in the case of this example. The absolute address data is used for controlling position of recording tracks during recording and for controlling position of reproduced and scanned tracks during reproduction which will be described later.

The disk 11 is turned by a spindle motor 12. The rotation of the spindle motor 12 is controlled by a servo control circuit 15 so that the disk 11 turns at a constant linear speed for example.

A shutter is provided in the disk 11. It is opened when the disk 11 is placed on a disk mounting tray and is loaded into the unit. A magnetic head 13 for recording is disposed above the shutter opening section of the disk 11 facing thereto and a optical pickup 14 is disposed under the shutter opening section of the disk 11 facing thereto.

The optical pickup 14 has a light emitting section and light receiving section and is moved and controlled in the radial direction of the disk 11 by a feed motor 16. Focusing and tracking control of the optical pickup 14 is implemented by the servo control circuit 15.

The system controller 3 is provided with a microcomputer and controls operations of the whole. The system controller 3 is supplied with a key input signal from a key group 4. The key group 4 contains a shooting and recording standby key, shooting and recording start key, playback key, stop key and others.

A video signal from the camera section 1 is supplied to an A/D converter 21 to convert one pixel sample for example into 8 bits digital video signal and is supplied to a signal processing circuit 22. The signal processing circuit 22 separates an image of a scene taken by the camera section 1 into a background plane composed of a still image representative of a stationary motionless background and a plurality of motion planes composed of still images representing each moving object moving on the background.

Figure 2:
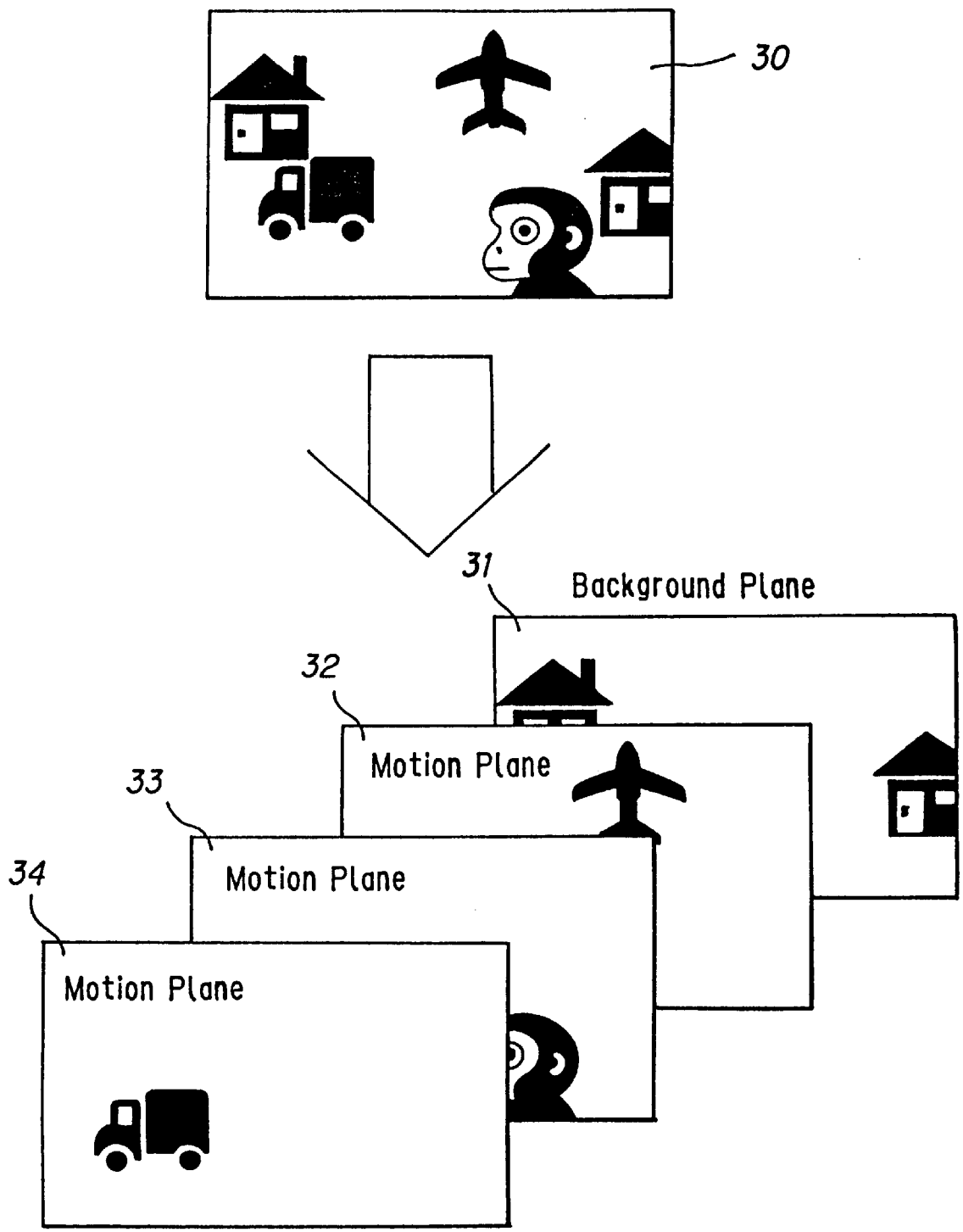
FIG. 2 are drawings for explaining a main part of the present invention.

In a case when the video image is a 2-D image 30 as shown in FIG. 2, the stationary still image representative of motionless constructions and the like is extracted as a background plane 31. Then an airplane, monkey and vehicle are recognized as moving objects in the example of FIG. 2 and are separated respectively as motion planes 32, 33 and 34.

Figure 5:
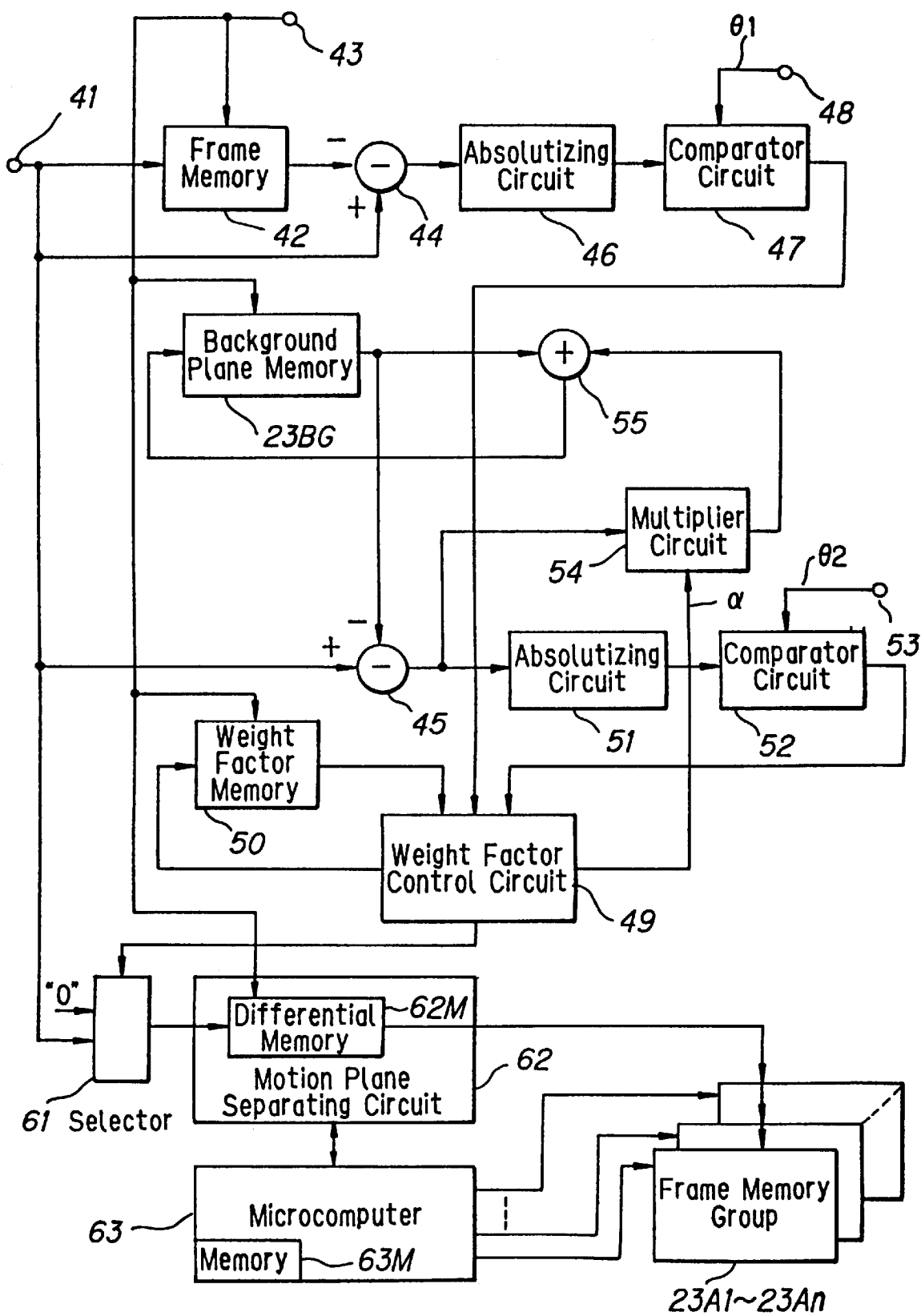
FIG. 5 is a block diagram of one embodiment of a signal processing circuit 22 of the present invention.

The signal processing circuit 22 writes the separated background plane into a background plane memory 23BG shown in FIG. 5. It also writes the separated n motion planes into motion plane memories 23A1 through 23An (n: natural number). A concrete embodiment for separating the background plane and motion planes will be described later.

Image data of each still image separated into the background plane and the plurality of motion planes and written into the plane memories 23BG and 23A1 through 23An is recorded in the disk 11 beforehand in a preliminary stage before actually starting to shoot and record by the video camera in this example.

That is, when a normal video shooting and recorded is to be started, a standby mode is set before that, the video camera section 1 is put into an operation state and a composition to be shot is determined through a view finder. Utilizing this time, the background plane and motion planes are separated, recorded and transmitted in the present embodiment.

Figure 3:
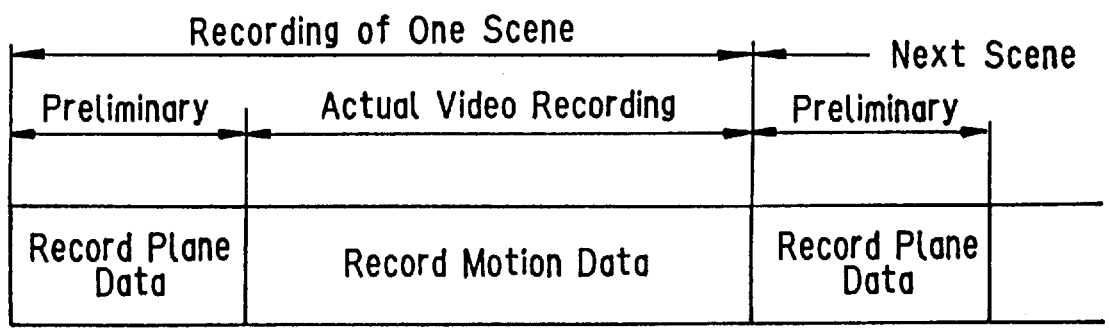
FIG. 3 is a diagram for explaining a signal recording timing of the embodiment shown in FIG. 1.

That is, in this case, one scene is recorded in a preliminary period and in an actual shooting and recording period as shown in FIG. 3. The plane separating process and recording process of the separated plane data described above are carried out in the preliminary period.

Figure 4:
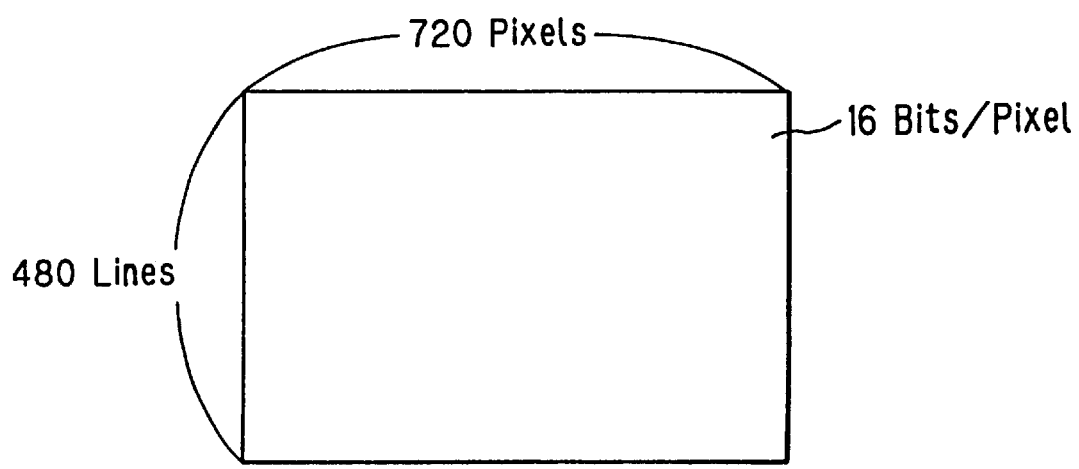
FIG. 4 is a drawing for explaining the embodiment in FIG. 1.

In this case, if each plane data is composed of 480 lines×720 pixels and data of one pixel is composed of brightness signal Y (8 bits) and color information U and V (8 bits) for example as shown in FIG. 4, a still image data of each plane has an information amount of about 5.6 M bits. Although it is possible to record it into the disk 11 without compressing it, it takes about 5 seconds to record one plane if a rate for recording data into the disk is 1.2 Mbps for example, taking 20 seconds to record the four planes.

Due to that, in the present embodiment, the image data written into each plane memory 23BG and 23A1 through 23An is supplied to a compressing circuit 24 to adequately compress each plane data, which is then supplied to a record processing circuit 25. The record processing circuit 25 implements data processing to conform to a recording format of the disk 11 by reforming data into a sector structure for example. Output data of the record processing circuit 25 is supplied sequentially to the magnetic head 13 for recording via a head driving circuit 27 to record in the disk 11 magneto-optically by a magnetic modulation overwrite scheme.

If a data compression ratio in the compressing circuit, 24 is 1/10, the aforementioned four plane data can be recorded in a preliminary time of 2 seconds. Because the data compression ratio becomes more than 1/100 if a full frame of dynamic image data having the same information amount is to be transmitted at 1.2 Mbps, a degradation of image quality of the plane data is very little as compare to the former.

Then, in the present embodiment, motion change information such as a moving direction, moving distance, rotation, deformation and the like of the moving object registered in each motion plane is generated in the actual shooting and recording period after the shooting and recording start key has been manipulated and the generated motion change information is recorded in the disk 11 on real-time.

To that end, a motion change information detecting circuit 31 finds the motion change information of the moving object in each motion plane from the input digital video signal using the data of the separated background plane and n motion planes in the shooting and recording mode. Then the motion change information is supplied to a compressive coding circuit 26 to be compressed and coded at an adequate compression ratio and is supplied to the head driving circuit 27 via the record processing circuit 25. Here a number of bits of the motion change information to be recorded becomes very small as described later and it can be fully transmitted on real-time even with the low bit rate of 1.2 Mbps. A concrete embodiment of a method for detecting the motion change information will be described later.

The data is recorded to the magneto-optic disk 11 as follows. That is, as the data is supplied to the magnetic head 13 for recording via the head driving circuit 27, a magnetic field modulated by the data to be recorded is applied to a predetermined position on the disk 11. Further, a laser beam from the optical pickup 14 is irradiated onto the same position on the disk 11. A laser beam having a constant power which is larger than that during reproduction is irradiated to a recording track at this recording time. The data is recorded to the disk 11 by thermo-magnetic recording by the irradiation of the light and the modulated magnetic field caused by the magnetic head 13. The magnetic head 13 and optical pickup 14 are arranged so as to be movable synchronously along the radial direction of the disk 11.

Further, during the recording, an output of the optical pickup 14 is supplied to an address decoder 29 via a RF amplifier 28 to extract and decode absolute address data recorded with wobbles in the pregrooves provided along the tracks on the disk 11. Then the detected absolute address data is supplied to the record processing circuit 25 to insert to the data to be recorded and is recorded on the disk 11. The absolute address data is also supplied to the system controller 3 to be used to recognize recording position and to control the position.

Information on which track and on which sector the background plane data, motion plane data and motion change information of each scene are recorded is recorded in a disk management area called a TOC (Table Of Contents) area provided in the inner most periphery of the disk.

By the way, during this recording, a signal from the RF amplifier 28 is supplied to the servo control circuit 15 and a control signal for controlling the servo to keep the linear speed of the spindle motor 12 is created from the signal from the pregroove on the disk 11 to control the speed of the spindle motor 12.

FIG. 5 is a block diagram of one embodiment of the signal processing circuit 22.

That is, image data in which one pixel is represented by, 8 bits from the A/D converter 21 is supplied to a frame memory 42 and to subtracter circuits 44 and 45. The input image data is also supplied to a motion plane separating circuit 62 via an data selector 61.

The frame memory 42 stores one frame of data of 8 bits per one pixel and the subtracter circuit 44 subtracts pixel data which corresponds to the same sampling position of the previous frame from the input pixel data. An output of a difference of the subtracter circuit 44 is supplied to an absolutizing circuit 46 to absolutize it per each pixel and is supplied to a comparator circuit 47.

A threshold value θ1 is supplied to the comparator circuit 47 through a terminal 48. When the absolute value of the output of the difference from the absolutizing circuit 46 is less than the threshold value θ1, a discrimination output of "1" is obtained and when it is more than θ1, "0" is obtained. This discrimination output is supplied to a weight factor control circuit 49.

In FIG. 5, the reference numeral (23BG) denotes the background plane memory and as will be described later, background plane image (still image) is stored therein as the initial state passes.

The reference numeral (50) denotes a weight factor memory in which weight factors of one frame are stored. Weight factors of 3 bits for example are stored in the weight factor memory 50.

Addresses of the frame memory 42, background plane memory 23BG and weight factor memory 50 are controlled in common by an address control signal supplied from the system controller 3 via the input terminal 43 and are specified with the same address.

The subtracter circuit 45 subtracts the image data stored in the background plane memory 23BG from the input pixel data and an output of a difference of the subtracter circuit 45 is supplied to an absolutizing circuit 51 to find an absolute value of the output of the difference per each pixel data. The absolute value of the difference from the absolutizing circuit 51 is supplied to a comparator circuit 52 to compare a threshold value θ2 which is supplied to the comparator circuit 52 through a terminal 53. When the absolute value of the output of the difference of the input pixel data and the background pixel data is less than the threshold value θ2, a discrimination output of "1" is obtained and when it is more than θ2, "0" is obtained from the comparator circuit 52. This discrimination output of the comparator circuit 52 is supplied to the weight factor control circuit 49.

The output of the difference between the input pixel data and background pixel data from the subtracter circuit 45 is also supplied to a multiplier circuit 54 to multiply with a weight factor α generated by the weight factor control circuit 49. The multiplication output of the multiplier circuit 54 is supplied to an adder circuit 55 to add with the background pixel data stored in the background plane memory 23BG. The addition output is written into the background plane memory 23BG.

The weight factor from the weight factor control circuit 49 is written into the weight factor memory 50 and a weight factor read out of the weight factor memory 50 is supplied to the weight factor control circuit 49.

The weight factor control circuit 49 discriminates whether the pixel data is motion pixel or not from the discrimination output of the comparators 47 and 52.

In the arrangement made as described above, the background plane memory 23BG, subtracter circuit 45, multiplier circuit 54 and adder circuit 55 constitute a digital filter using the background plane memory 23BG as a 1 frame delaying element. That is, a k-th frame background pixel data (estimated value) Xk is expressed as follows;

$$Xk=\alpha*(Zk-X(k-1))+X(k-1)=(1-\alpha)*X(k-1)+\alpha*Zk$$

where α is the weight factor, Zk is a k-th frame input pixel data and X(k−1) is a background image data read out of the background plane memory 23BG.

In the present embodiment, α is fixed at 1/16 for example during one scene in which the background does not change. White noise contained in the input image may be removed by repeating the calculation represented by the above equation across a plurality of frames and S/N of the background image stored in the background plane memory 23BG may be improved.

When the background changes like when the scene changes, i.e. the video scene changes to another video scene, the weight factor α is doubled per frame from 1/16 so as to shorten the response time and not be influenced by colored noise. That is, the background image is renewed gradually by using weight factor a which exponentially increases from 1/16→1/8→1/4→1/2→1. Accordingly, there are five kinds of weight factors a and each is represented by 3 bits. The weight factor α is made to be power of 2 in order to realize the multiplier circuit 54 by a shift register or selector.

In the present embodiment, the background still image data is stored in the background plane memory 23BG as the initial state has passed. An absolute value of a difference between the present image and the background image is detected by the subtracter circuit 45 and absolutizing circuit 51. The absolute value of the difference and the threshold value θ2 are compared by the comparator circuit 52 and the present pixel is determined to be that of the background image and the following processing is carried out when the absolute value of the difference is less than the threshold value θ2.

That is, at this time, the weight factor a is fixed to $2^{-4}(=1/16)$. Then the weight factor α is multiplied with the output of the subtracter circuit 45 and is added to the output of the background plane memory 23BG at the adder circuit 55. Then the adder output is written into the same address in the background plane memory 23BG to renew the background plane memory. The weight factor at this time is written into the weight factor memory 50.

When the absolute value of the difference between the present pixel and the background pixel is determined to be more than the threshold value θ2 by the comparator circuit 52, the absolute value of the difference between the present pixel and a corresponding pixel in the previous frame detected by the subtracter circuit 44 and absolutizing circuit 46 is checked as an output of the comparator circuit 47 if it is less than the threshold value θ1 or more than the threshold value θ1. The following processing is carried out when the output of the comparator circuit 47 is less than the threshold value θ1.

That is, that it is less than the threshold value θ1 indicates that the background has been changed due to scene change or the like, and the weight factor α (=1/16) stored in the weight factor memory 50 is read out at first and is multiplied with the output signal of the subtracter circuit 45 by the multiplier 54. Accordingly, renewal of the background pixel made in this frame is expressed similarly to that described above as;

$$Xk=15/16*X(k-1)+1/16*Zk$$

When the background pixel is renewed, α is doubled and it is discriminated if the doubled weight factor is greater than 1 or not in the weight factor control circuit 49. If it is less than 1, the doubled weight factor α is stored in the weight factor memory 50. The weight factor α changes per one frame as (1/8→1/4→1/2→1) starting from the weight factor of 1/16.

The process does not shift to the process for renewing the background pixel similar to that described above until the fifth frame wherein α=1 as the background is changed and the weight factor α is changed as described above. Accordingly, even when colored noise is erroneously detected as a new background pixel and a processing for changing the weight factor is received, the correct background pixel will be preserved. The way how the weight factor α changes is set so as to improve the responsibility during renewal of the background pixel and to be able to remove colored noise.

When the absolute value of the difference between the present pixel and that of the previous frame is determined to be more than the threshold value θ1 by the comparator circuit 47, i.e. when the present pixel is determined to be a motion pixel, the background plane memory 23BG is not renewed this time. For the motion pixel, a processing for separating motion planes is carried out as described below.

The weight factor control circuit 49 detects the motion pixel when the absolute value of the difference between the present pixel and the background pixel is detected to be more than the threshold value θ2 by the comparator circuit 52 and when the absolute value of the difference between the present pixel and that of the previous frame is detected to be more than the threshold value θ1 from the output of the comparator circuit 47.

A motion pixel detection signal from the weight factor control circuit 49 is supplied to the data selector 61 and the input digital pixel data from the input terminal 41 input to this data selector is gated. This data selector 61 is switched so as to output image data from the input terminal 41 when the present pixel is a motion pixel. Accordingly, when the input pixel (present pixel) is not a motion pixel, an output of the data selector 61 becomes '0' and when the input pixel is a motion pixel, its pixel data (this is data not '0', which is referred to as non-zero data hereinafter) is output from the data selector 61.

The motion plane separating circuit 62 is provided with a differential memory (frame memory) 62M which is capable of storing one frame of pixel data, and the output of the data selector 61 is input to the memory 62M. The memory 62M is subjected to the same address control with the frame memory 42, background plane memory 23BG and weight factor memory 50 described above by the address control signal from the input terminal 43.

Figure 6:
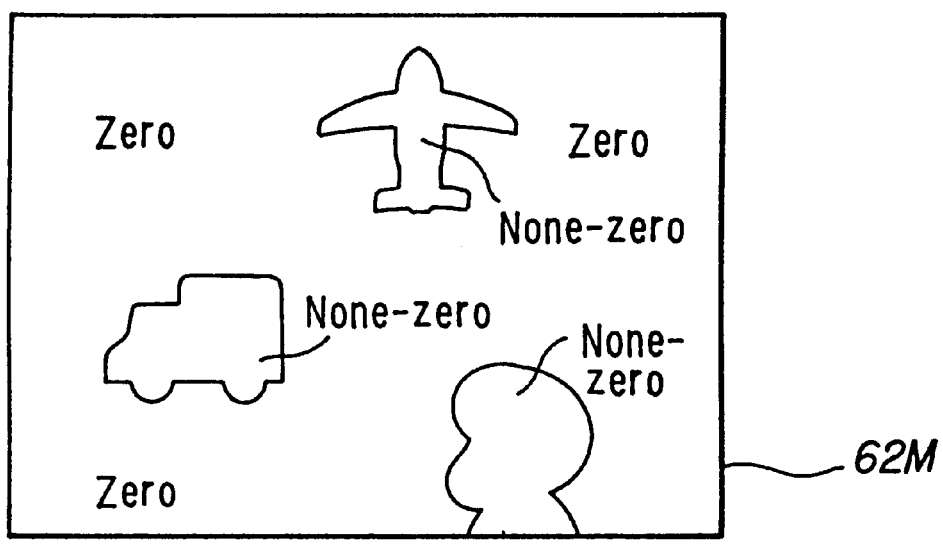
FIG. 6 is a drawing for explaining an operation of the signal processing circuit in FIG. 5.

Accordingly, a differential image wherein the background image is removed from the present image and composed of only images of a plurality of moving objects composed of sets of motion pixels composed of non-zero data is stored in the differential memory 62M. Then, as shown in FIG. 6, '0' data is written into the memory 62M as pixel data other than the non-zero pixel data of the moving objects.

Thus the pixel data of the plurality of moving objects in one 2-D image is written into the differential memory 62M as non-zero pixel data having a non-zero level and the pixel data of still image portion of the background image other than the pixels of the moving objects is stored as all zero data. Accordingly, the motion planes each representing only each moving object may be separated by sequentially scanning pixel data in the differential memory 62M and relating and merging non-zero pixel data among nearby pixels provided that the plurality of moving objects do not overlap each other. A A microcomputer 63 raster scans the differential memory 62M in the motion plane separating circuit 62 to separate the planes per each moving object as described later and writes information on the separated motion planes into each motion plane memory 23A1 through 23An at a corresponding address. By the way, '0' has been written into each of all addresses of the motion plane memories 23A1 through 23An beforehand and pixels of each moving object are written into one of the motion plane memory at the same address with the differential memory 62M.

Figure 7:
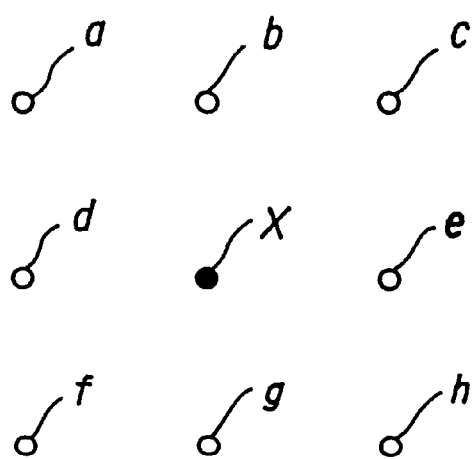
FIG. 7 is a drawing for explaining the operation of the signal processing circuit in FIG. 5.
Figure 8:
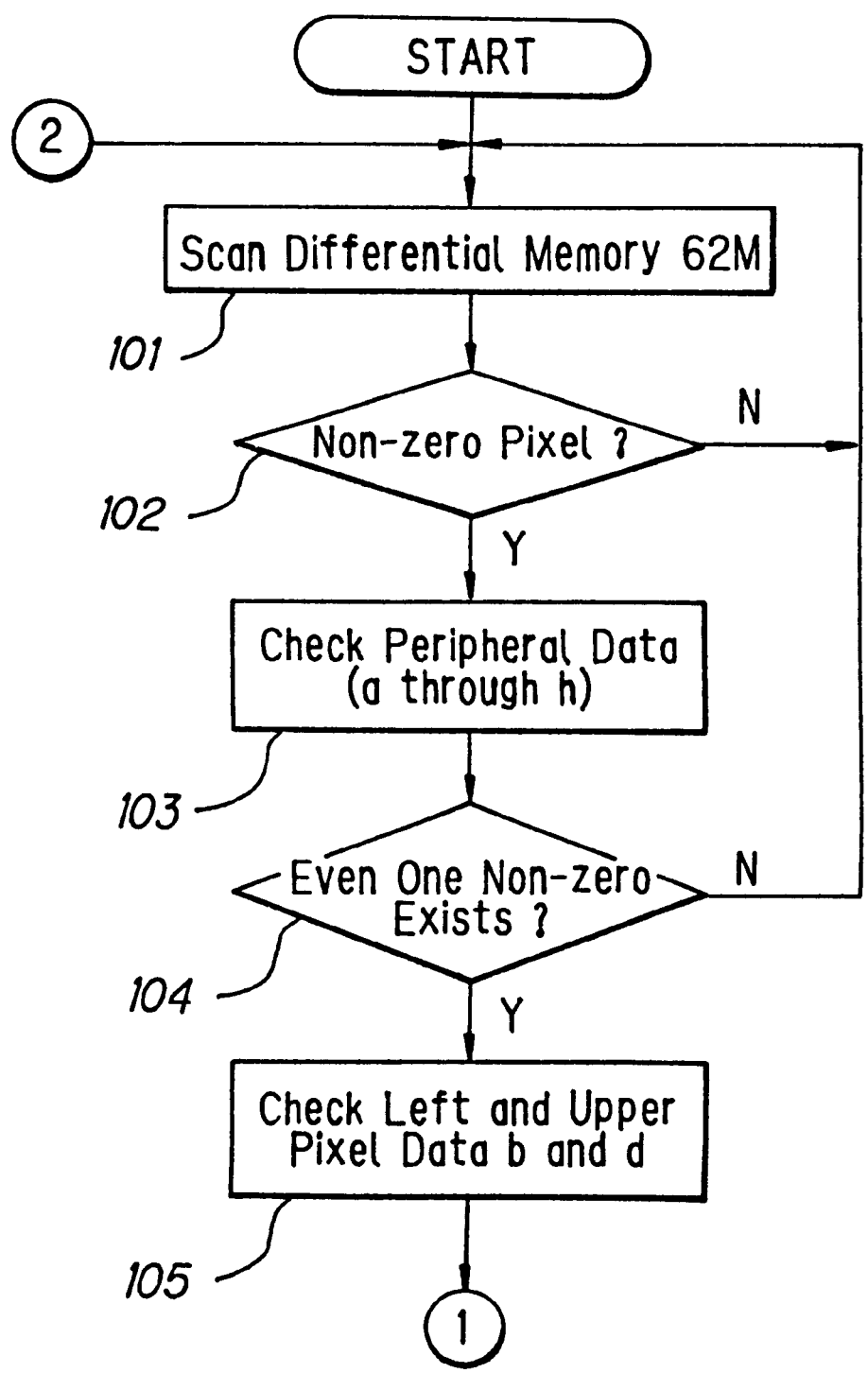
FIG. 8 is a flow chart showing a part of a flow of the operation of the embodiment in FIG. 5.
Figure 9:
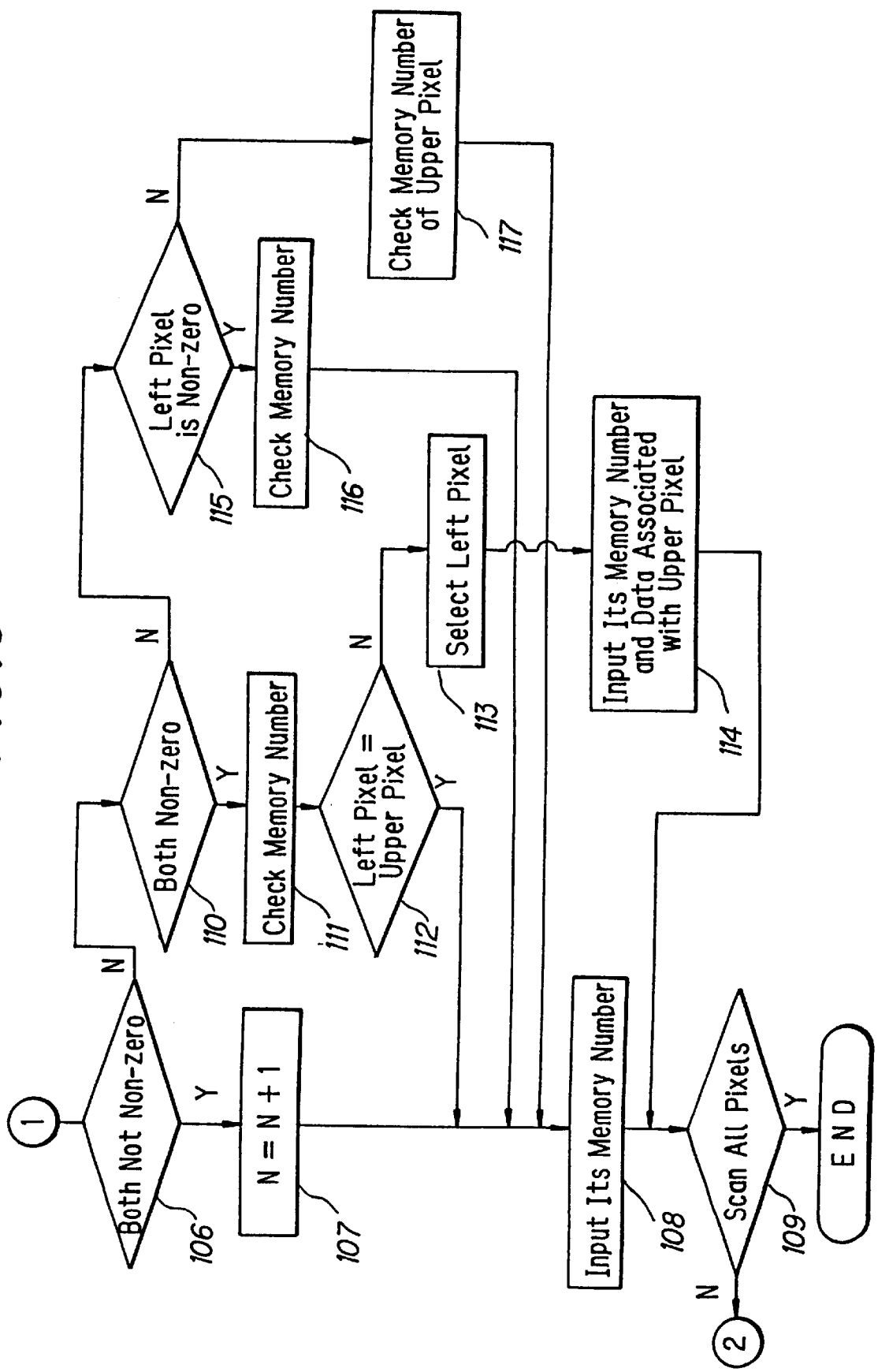
FIG. 9 is a flow chart showing a part of a flow of the operation of the embodiment in FIG. 5.

FIGS. 8 and 9 are flowcharts of the process for separating the motion planes of the microcomputer 63. That is, in this case, the process for separating the moving objects is initiated by scanning the pixel data in accordance to the raster scan in Step 101. Then if the scanned pixel data is non-zero pixel data in Step 102, the process advances to Step 103 to check whether pixel data around that is non-zero or not. In this case, data of 8 pixels a through h around a pixel x to be noticed are checked as shown in FIG. 7.

Then when none of data of the 8 pixels a through h is non-zero in the next Step 104, i.e. when the all are zero, the pixel x to be noticed is assumed to be an isolated point and the process returns from Step 104 to Step 101 to scan the next pixel data. That is, because the moving object cannot be considered to be formed only by one pixel, it is considered to be noise in this case.

When there is even one non-zero pixel among the 8 pixels a through h in Step 104, the process advances from Step 104 to Step 105 to check whether the pixel d on the left of and the pixel b above (ahead by one line) the pixel x to be noticed are non-zero pixels or not and advances to next Step 106. The left and above pixels are checked here in order to compare with already checked pixels following to the order of the raster scan.

In the next Step 106, the left and above pixels d and b are discriminated whether the both are not non-zero. If the both are not non-zero, i.e. not motion pixels, the process advances to Step 107 to set up a new number as a memory number of the motion plane memory (hereinafter simply referred to as a memory number). That is, the number which indicates to which frame memory to store in the frame memory group 23A1 through 23An is set up. The memory number is stored in a memory of the microcomputer 63 corresponding to an address of the pixel in Step 108. After that, the process advances to Step 109 to discriminates whether the scanning of all pixels in the differential memory 62M has been completed or not and when it has been completed, this process routine is finished. If the scanning of the all is not completed yet, the process returns to Step 101 to start a retrieval of the next motion pixel.

When it is discriminated in Step 106 that at least one among the left and above pixels d and b is non-zero pixel, the process advances from Step 106 to Step 110 to discriminate whether the both are non-zero. When the both are discriminated to be non-zero, the memory number stored in the memory in the microcomputer 63 is checked for the both pixels d and b in Step 111. Then it is discriminated whether the memory numbers of the both pixels d and b match in Step 112.

When the memory numbers of the both pixels d and b match as a result of the discrimination in Step 112, the process advances from Step 112 to Step 108 to store the matched memory number in the memory of the microcomputer 63 corresponding to the address of the pixel x to be noticed.

When it has been discriminated that the memory numbers of the both pixels d and b do not match as a result of the discrimination in Step 112, the memory number of the left pixel d is selected to store it corresponding to the pixel x to be noticed and merge data indicating, that the memory number of the left pixel d and that of the above pixel b are related and that they are pixels of one moving object even though their memory number differ is stored in the memory of the microcomputer 63.

This shows a case wherein though the moving object is represented by pixels at jumped positions in data of one horizontal scan line, it is clarified that they are linked as pixels of one moving object as a result of the search of pixels in the later line.

When the both are not both non-zero as a result of the discrimination in Step 110, it is discriminated whether the left pixel d is non-zero or not in Step 115. When the left pixel d is non-zero as a result of the discrimination, the memory number of the pixel d is checked in Step 116 and then the same memory number with that of the pixel d is stored in the memory of the microcomputer 63 corresponding to the address of the pixel x to be noticed in Step 108.

When it is discriminated that the left pixel d is not non-zero, i.e. the above pixel b is non-zero, as a result of the discrimination in Step 115, the memory number of the pixel b is checked in Step 117 and then the same memory number with that of the pixel d is stored in the memory of the microcomputer 63 corresponding to the address of the pixel x to be noticed in Step 108.

As described before, the process advances to Step 109 after Step 108 to discriminate whether the search of all the pixels in the differential memory 62M has been completed or not. If it is not completed yet, the process returns to Step 101 to repeat the aforementioned process routine and if the search of all the pixels has been completed, this process routine is finished.

Figure 10:
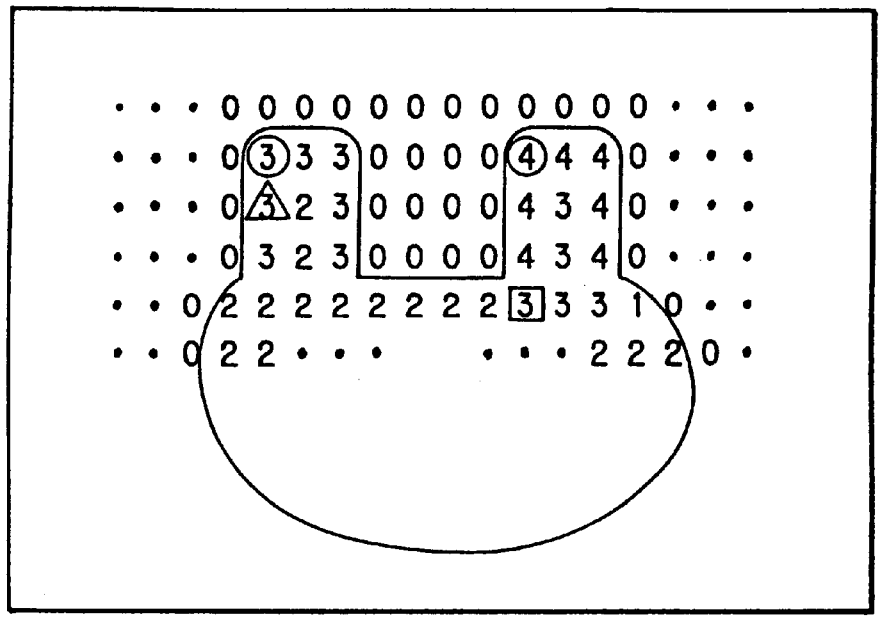
FIG. 10 is a drawing for explaining the operation of the signal processing circuit in FIG. 5.
Figure 11:
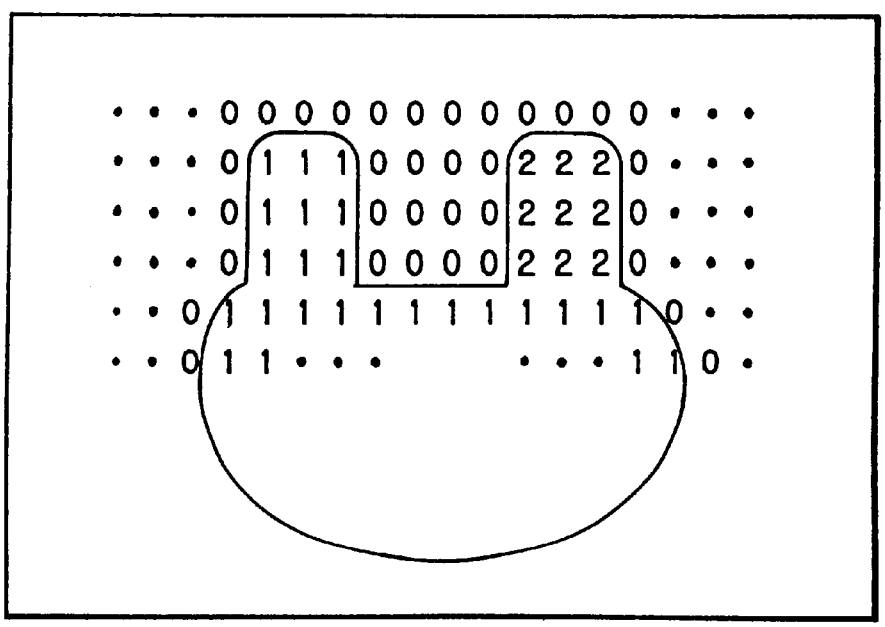
FIG. 11 is a drawing for explaining the operation of the signal processing circuit in FIG. 5.

Referring now to FIGS. 10 and 11, the aforementioned. process routine will be explained further.

FIG. 10 shows image data of one screen stored in the differential memory 62 wherein the center portion, i.e. the portion where numerals other than zero are written, is a portion detected as being a moving object by the motion plane separating circuit 62.

The microcomputer 63 executes the aforementioned process routine to the image data stored in the aforementioned differential memory 62M following to the order of the raster scan. Here, zeros among numerals shown in FIG. 11 represent the pixel data stored in the still image plane and 1 and 2 represent the pixel data stored any one of the frame memories 23A1 through 23An.

Now scanning following to the order of the raster scan, a pixel data represented by 3 rounded by circle is detected to be a non-zero pixel in Step 102. Then, because this pixel data has non-zero pixels among the surrounding pixels and data of the left and above pixels, i.e. the pixel data which correspond to the pixels b and d in FIG. 7, are both zero, new memory numbers are set in Step 107. At this time, because it is non-zero data detected for the first time, a memory number "1" is set. Then the memory number "1" is stored at the corresponding pixel position of the memory 63M in the microcomputer 63 as shown in FIG. 11.

Then, because a value of the next pixel data is "3", i.e. non-zero,.and the left pixel is "3", i.e. non-zero, and the above pixel data is zero, the process advances to Step 108 via Step 116 to store the memory number "1" at the corresponding pixel position in the memory 63M. As the aforementioned process routine is executed in the similar manner, because there is a pixel data represented by 4 rounded by circle which has non-zero data around it and the left and above pixel data are both zero data as shown in FIG. 10, the process advances to Step 108 via Step 107 to store memory number "2" at the corresponding pixel position in the memory 63M.

Next, because there is a non-zero pixel around and the left pixel is zero data and the above pixel is non-zero data in a process routine for the pixel data represented by 3 rounded by triangle in FIG. 10, the process advances to Step 108 via Step 117 to store the memory number "1" at the corresponding pixel position in the memory 63M. That is, data of the same moving object can be integrated when the data is scanned following to the order of the raster scan by detecting whether the left and above pixels of the pixel to be noticed are non-zero data or not. Further, in the process routine for the pixel data represented by 3 rounded by square in FIG. 10, there is non-zero data around and the left and above pixels are both non-zero data, and the memory number of the left and above pixel is different. Accordingly, the same memory number with that of the left pixel data, i.e. the memory number "1", is stored at the corresponding pixel position in the memory 63M and information indicating that it is related with the above pixel, i.e. the pixel whose memory number is "2". That is, when the pixel data above and right to the pixel to be noticed which is non-zero are both non-zero, there is a much possibility that those three pixel data represent the same moving object. However, when the aforementioned process routine is carried out following to the order of the raster scan, different memory numbers may be given as described above even though they are pixel data representing the same moving object. Therefore, data indicating that both memory numbers are related is stored when there is non-zero data around the pixel to be noticed, the pixel data on the left and above thereof are both non-zero data and the memory number of the left and above pixel data are different. Thereby, although the both memory numbers are stored in the memory 63M as being different numbers, they are stored in the same frame memory when the pixel data's stored in the frame memory group 23A1 through 23An.

Through the search of pixels on the differential memory 62M described above, the memory numbers are stored in the built-in memory of the microcomputer 63 together with data indicating a relationship with other memory numbers for each moving object related memory number for addresses of pixels contained in each moving object. The microcomputer 63 correlates the memory numbers of pixels recognized as representing the same moving object with the memory number No. of one dynamic image plane memory. Thereby each moving object may be separated as a separate dynamic image plane as follows.

That is, the microcomputer 63 read motion pixel data sequentially from the differential memory 62A. An output read out of the differential memory 62A is input to the dynamic image plane memories 23A1 through 23An, respectively. The microcomputer 63 also sets up the read pixels as described above and supplies write pixel addresses (this may be same as the read pixel address) only to the dynamic image plane memory of the stored memory number No. to write the motion pixels to the dynamic image plane memory of that memory number No.

Thus each moving object is separated and stored separately into the motion plane memories 23A1 through 23An.

Although the differential memory 62M has been scanned to search the pixels horizontally and vertically in the same manner with TV scanning to merge pixels contained in the same moving object in the motion plane separating method described above, it is possible to complete the motion plane memory for one moving object by, when one motion pixel is detected, sequentially searching surrounding pixels to trace non-zero pixels to merge and by sequentially writing the merged pixels into one motion plane memory in the same time.

By the way, even if two moving objects overlap each other at a given point of time, the moving objects may be observed separately as a certain time passes, so that the aforementioned method allows each motion plane memory to accumulate the motion plane data representing only each moving object by appropriately rewriting the motion plane memory.

Figure 12:
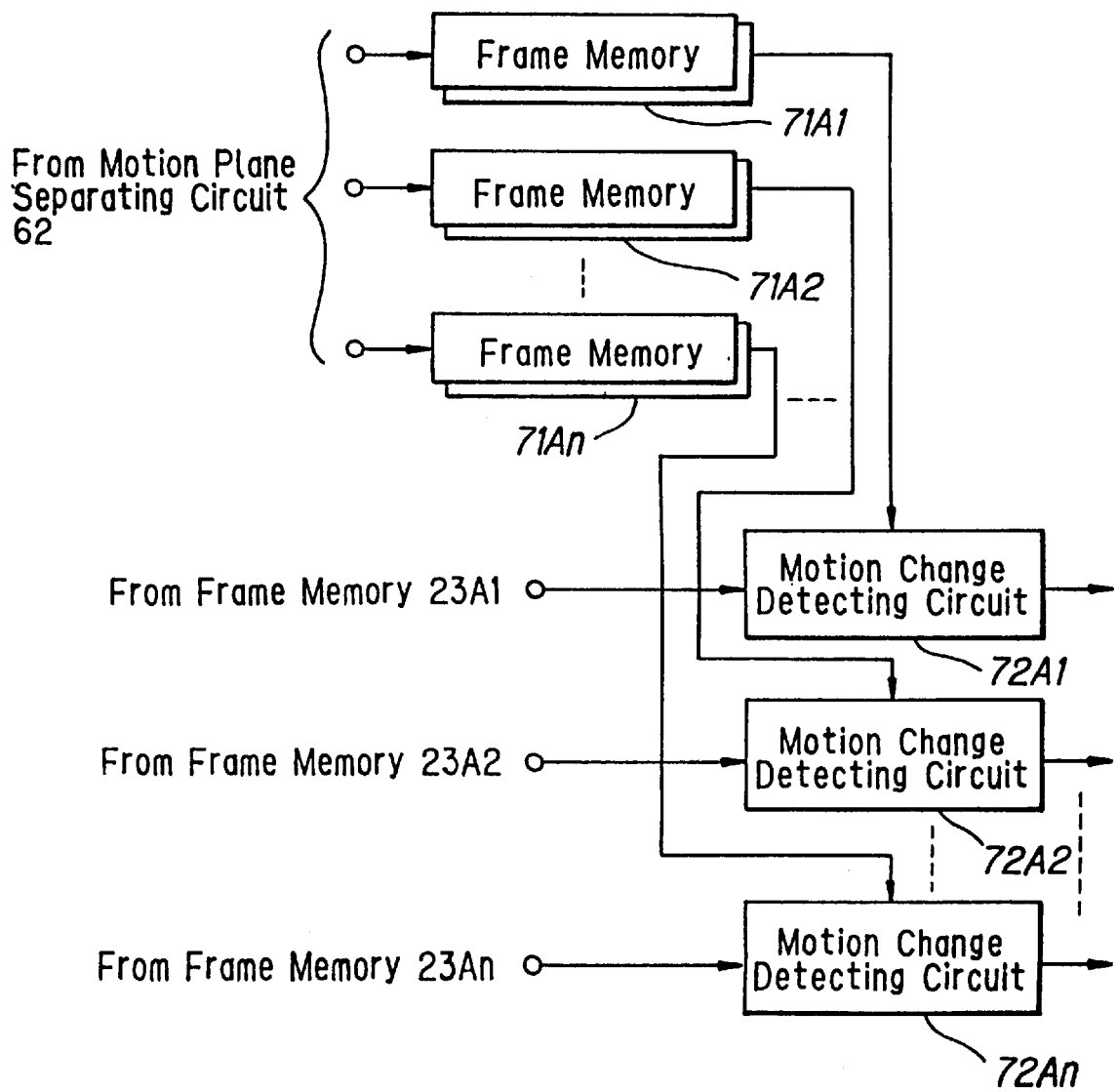
FIG. 12 is a block diagram of one embodiment of a motion change information detecting circuit 31 of the present invention.

Referring now to FIG. 12, a structural example of a motion change information detecting circuit for detecting motion change information of each moving object will be explained.

The motion change information is generated from the present image data using the data in the background plane memory 23BG and motion plane memories 23A1 through 23An. The circuit shown in FIG. 12 operates when the preliminary period described above passes and the shooting and recording start key is manipulated. That is, the motion change information is recorded on real-time in this example.

The image data is separated into plane information per each moving object in the motion plane separating circuit 62 in the signal processing circuit 22 described above. Then one frame of information of each moving object is written into frame memories 71A1 through 71An. That is, the motion plane separating circuit 62 shown in FIG. 5 is also connected to each of the frame memories 71A1 through 71An and writes motion pixels any one of the frame memories 71A1 through 71An based on the write pixel address from the microcomputer 63. The frame memories 71A1 through 71An are comprised of two frame buffers wherein when data on a moving object is written into one frame memory, data on motion plane is read from another frame memory to use the data to generate motion change information.

That is, image data of each moving object from the frame memories 71A1 through 71An is supplied to motion change detecting circuits 72A1 through 72An. And the motion plane data stored in the motion plane memories 23A1 through 23An during the preliminary period is supplied to the motion change detecting circuits 72A1 through 72An.

The motion change detecting circuits 72A1 through 72An find a motion vector of the moving object, i.e. a direction and degree of the motion, by matching patterns of the moving object stored in each of the motion plane memories 23A1 through 23An and each of the dynamic images from the frame memories 71A1 through 71An. At this time, because the moving object is stored in the memory as the motion plane beforehand, the motion vector of the whole moving object may be extracted and the matching process may be carried out in a relatively short time by noticing a specific central point or central block and by implementing the pattern matching on the central point or central block, provided that the shape of the moving object will not change.

When the moving object changes its direction or its shape, an error becomes significant in the pattern matching. Then the error is also transmitted as motion change information together with the motion vector in the present embodiment.

The data of the motion vector and matching error of the moving object in each motion plane memory thus obtained by the motion change detecting circuit 72A1 through 72An are supplied to the compressive coding circuit 26 to compress data. As described before, the data amount after the compression is very small as compare to video information, allowing to readily record in the disk on real-time.

A position of the moving object on each motion plane memory after the move can be detected readily as an address on the memory using the detected motion vector. Due to that, an overlapped state of moving objects may be recognized as the addresses of pixels of the plurality of moving objects become the same. When the plurality of moving objects thus overlap, a depth between the moving objects is detected from that pixels of which moving object are appearing in the present image as the pixels of the portion thereof. Then the depth data is transmitted together with the motion data. By the way, the depth data is found also for the background image and moving objects.

As the motion change information of the moving object, a predicted motion vector and object deformation data such as the following example may be transmitted.

Figure 13:
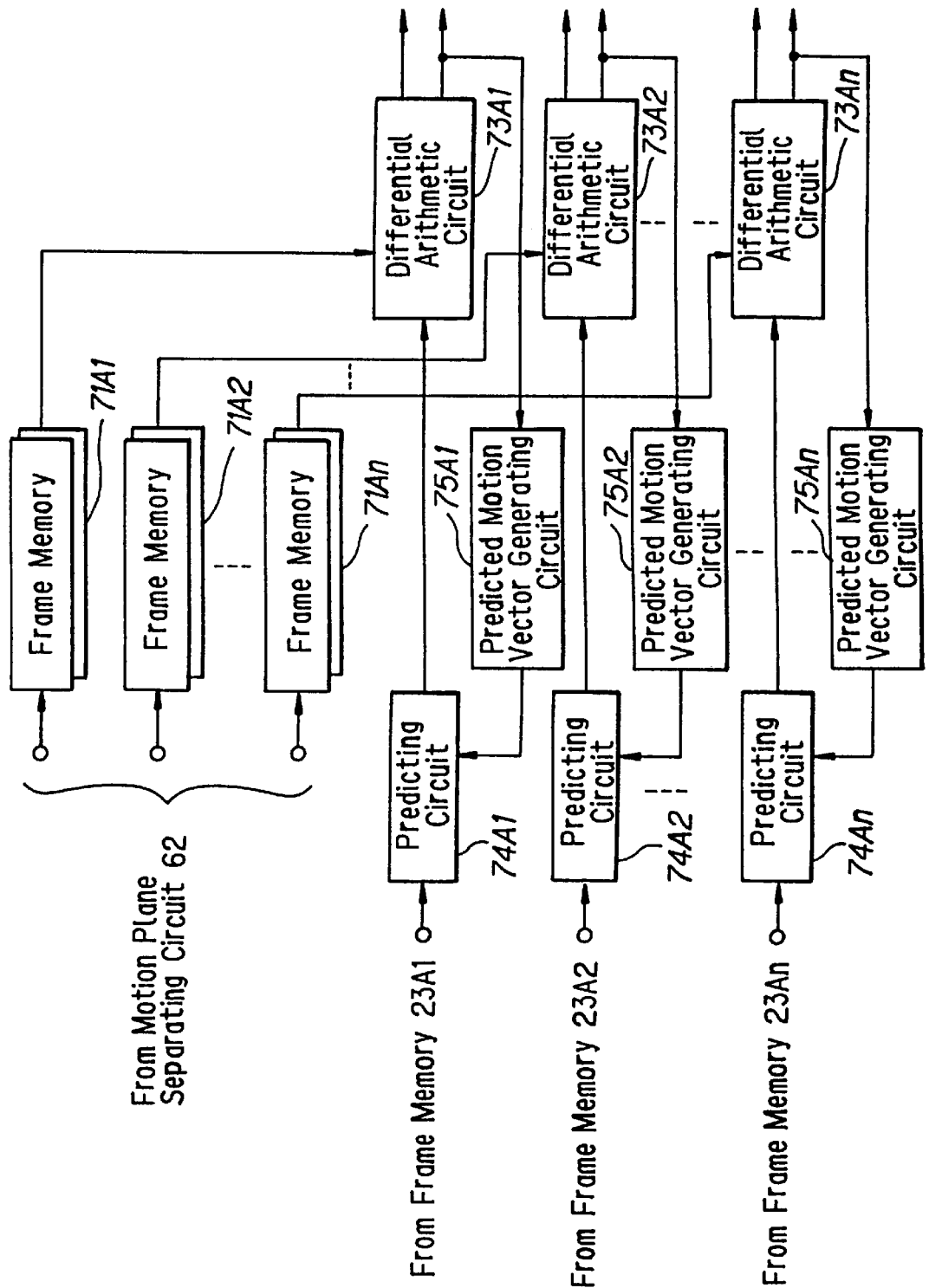
FIG. 13 is a block diagram of another embodiment of the motion change information detecting circuit 31 of the present invention.

That is, in an example shown in FIG. 13, frame data of each moving object extracted from input image data from the frame memories 71A1 through 71An is supplied to differential arithmetic circuits 73A1 through 73An.

Further, the motion plane data in the motion plane memories 23A1 through 23An is supplied to prediction circuits 74A1 through 74An to obtain frame image data of each moving object after a move at a predictable present time based on predicted motion vector from predicted motion vector generating circuits 75A1 through 75An. Then the frame image data of each of the predicted moving objects is supplied to the differential arithmetic circuits 73A1 through 73An to calculate a difference with the frame data of each moving object extracted from the input image data from the frame memories 71A1 through 71An.

The differential arithmetic circuits 73A1 through 73An output the difference of the images of the moving object to the compressive coding circuit 26 as an output data. The differential arithmetic circuits 73A1 through 73An also find a difference of motion vectors from the aforementioned difference of images of moving object and supplies it to the compressive coding circuit 26 and to the predicted motion vector generating circuits 75A1 through 75An to generate predicted motion vector of each moving object for the next frame.

Although the background image and still image of the moving object have been separated from the input image in the embodiment described above, it is possible to shoot the background image and the moving object individually beforehand when it is possible to shoot them in a state they are separated beforehand and to write into the background plane memory 23BG and motion plane memories 23A1 through 23An and to record in the disk 11.

Figure 14:
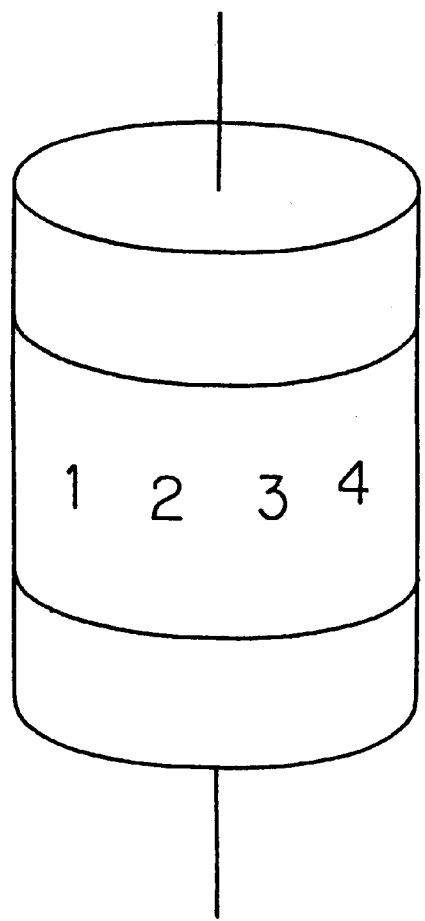
FIG. 14 is a drawing for explaining another embodiment of the present invention.
Figure 15:
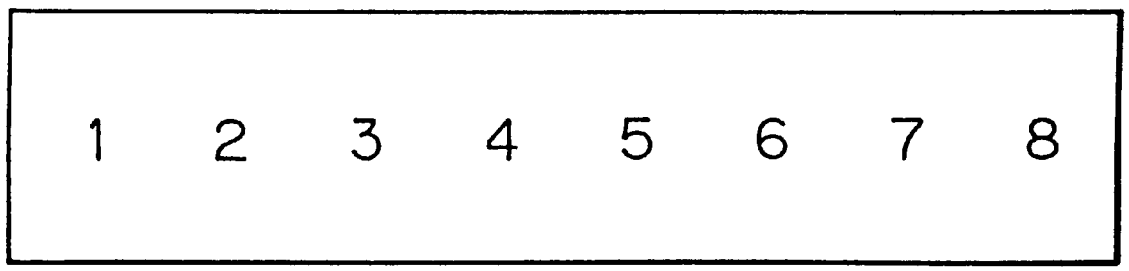
FIG. 15 is a drawing for explaining another embodiment of the present invention.

When a moving object is shot to prepare the motion plane beforehand as described above, reproduced image corresponding to its move may be obtained even when the moving object turns by shooting the moving object from all the directions centering on the moving object to obtain its development view. That is, when the moving object is an object which turns centering on an axis Z as shown in FIG. 14 for example, a reproduced image of the moving object which is arbitrary turning may be obtained by preparing a development view of the side face thereof as a motion plane as shown in FIG. 15 and by transmitting motion change information by adding turning data.

By the way, although the preliminary period has been set up before the actual shooting and recording to separate the background plane and motion planes and to record them in the disk during that period, it is also possible to execute from the recording of the still image plane data to the recording of motion change information on real-time without setting up the preliminary period because the information amount of the motion change information is very small. For example, if one scene takes 10 seconds, the still image plane and motion planes may be recorded by 2 seconds in the example described above, so that the real-time shooting and recording may be realized by storing the motion change information in the buffer memory for such 2 seconds without setting up the preliminary period.

Figure 16:
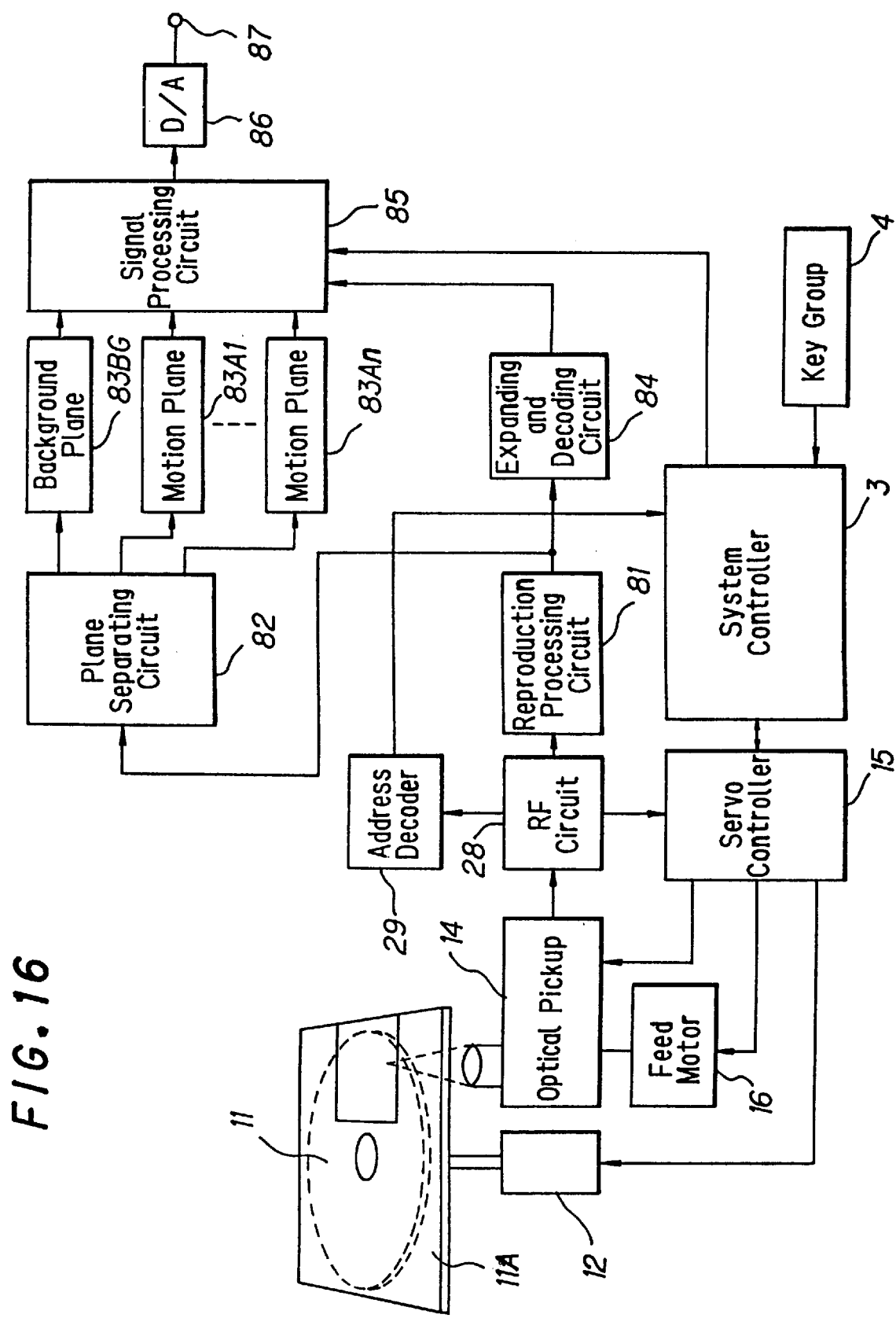
FIG. 16 is a block diagram of one embodiment of a digital video signal receiver of the present invention.

FIG. 16 is a block diagram of one embodiment of a disk reproducing unit. In the present embodiment, the same reference numerals are designated to the parts common with those of the disk recording unit shown in FIG. 1 and an explanation thereof will be omitted here.

By the way, although the disk recording unit in FIG. 16 is being shown separately from that shown in FIG. 1 in the present embodiment, the present invention is not limited to them and is applicable to any disk recording/reproducing unit capable of recording and reproducing on/from a disk.

When the disk 11 is loaded into the unit, the unit takes in the TOC area of the disk at first to recognize recorded position of the background plane and motion planes of each scene and that of motion change information by the system controller 3.

Then the system controller 3 reproduces data of the background plane and a plurality of motion planes of a scene to be reproduced at first from the TOC area information. The image data taken out of the disk 11 is supplied from the RF circuit 28 to a reproduction processing circuit 81 to implement a process for decoding data in a predetermined recording format such as a sector structure. The decoded data is then supplied to a data expanding and plane separating circuit 82. In the circuit 82, each plane data compressed by a low compression ratio is expanded and is separated per each plane data; the background plane data is written into a background plane memory 83BG and the motion plane data is written into motion plane memories 83A1 through 83An, respectively. Thereby a preparation for starting the reproduction of the video is completed.

Next, motion change information, depth data, turn data and the like of the scene are extracted on real-time referring to the TOC area information and are supplied to a data expanding and decoding circuit 84 via the RF circuit 28 and reproduction processing circuit 81. Then the motion change information and the like are expanded and decoded and are supplied to a signal processing circuit 85.

The signal processing circuit 85 is also supplied with each still image data from the background plane memory 83BG and motion plane memories 83A1 through 83An. In the signal processing circuit 85, the image of each moving object from the motion plane memories 83A1 through 83An is composited on the background image from the background plane memory 83BG using the motion change information and depth data of each moving object from the expanding and decoding circuit 84.

The dynamic image data from the signal processing circuit 85 is returned to the original analog signals by a D/A converter 86 and is derived from an output terminal 87.

When the moving object is what accompanies a turn as described before, such contents of image as the development view described above has been stored in the corresponding motion plane memory as motion plane data and the turn data is obtained from the expanding and decoding circuit 84, so that a portion thereof to be displayed on the screen is read from the motion plane memory corresponding to the turn data.

Referring now to FIGS. 17 through 21, another embodiment of the present invention will be explained.

A fixed background section is a maximum picture frame considered in filming and is registered in the background plane 23BG to record as a still image.

Moving parts are separated into each moving object similarly to the first embodiment to register into each of the motion plane memories 23A1 through 23An to record a still image of the moving object and to record change information of the moving object in each motion plane.

Figure 17:
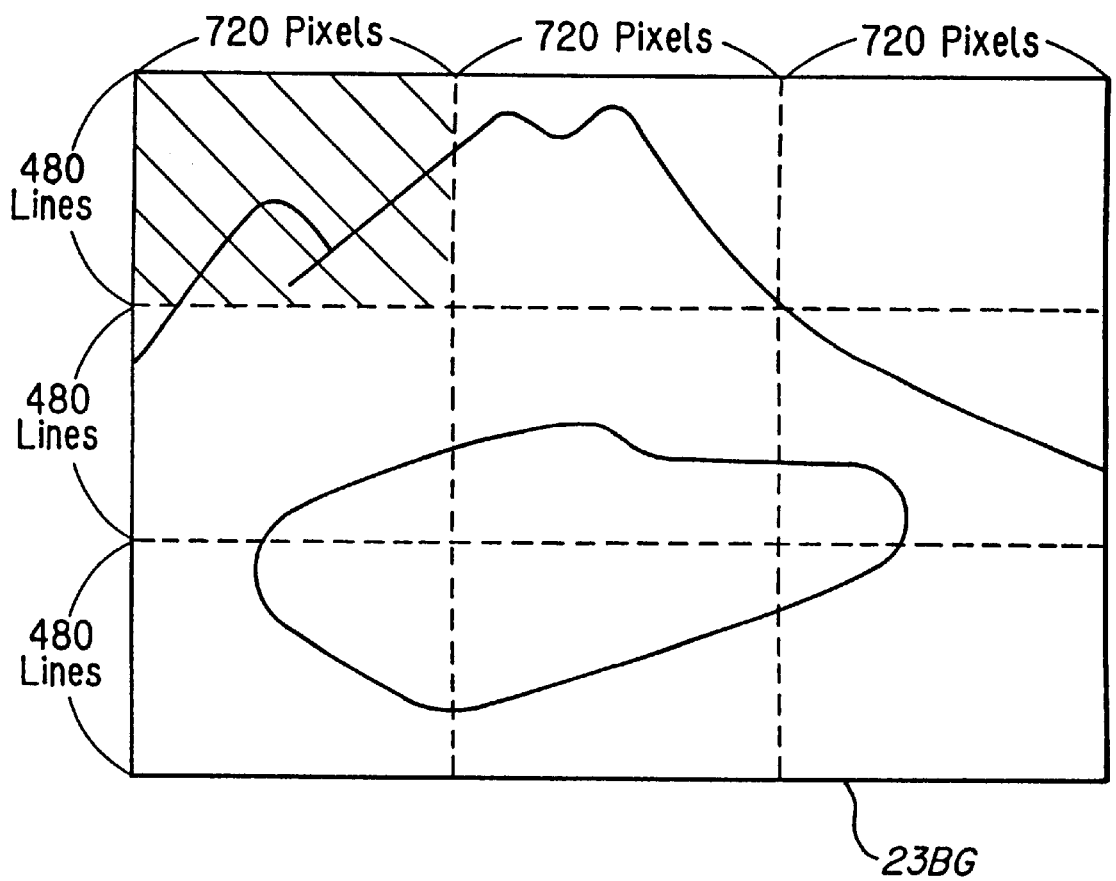
FIG. 17 is a drawing for explaining one example of a background plane memory 23BG of the present invention.

In the case of this example, while the motion plane memories 23A1 through 23An may be constructed with a memory having a capacity permitting to write one screen of still image data, the background plane memory 23BG is constructed by a memory having a large capacity permitting to store pixel data of a plurality of screens which is more than the pixel data of one screen as shown in FIG. 17. That is, the background plane memory 23BG is provided with a capacity permitting to write pixel sample data of (480×a) lines in the vertical direction and (720×b) pixels in the horizontal direction. In this example, a=3 and b=3.

Accordingly, when the background image at the central position of FIG. 17 is centered, a background which comes into the picture frame when the camera angle is changed by panning or tilting around the center background image may be written into the background plane memory 23BG beforehand. Further, when the camera is zoomed to the background image at the central position, all of the background image in the zoom range is written into the background plane memory 23BG. One example of a method for writing background image data whose range is wider than the picture frame of one screen will be described.

In this example, a certain key in the key group 4 is manipulated at first to shoot the background plane of the maximum picture frame by the camera section 1 and a mode for registering it to the background plane memory 23BG is set. Now the operation of this mode will be explained.

The camera section 1 of this example is provided with a zoom lens (not shown) and a wide background is shot by setting the zoom at the most wide angle. In this example, this shall be the maximum picture frame.

A video signal from the camera section 1 is supplied to the A/D converter 21 to be converted into a digital image signal in which one pixel sample is 8 bits for example and is supplied to the signal processing circuit 22. The signal processing circuit 22 separates an image of a scene shot by the camera section 1 into a motionless stationary background still image and each moving object which moves on the it background and registers the separated background image data in the buffer memory. A still image data in which the maximum picture frame background is shot as one screen as shown in FIG. 18 for example may be obtained from the buffer memory.

Next the zoom lens is set at the most telescopic side to shoot a portion in the maximum picture frame. The signal processing circuit 22 separates only the fixed background portion in which the components of the moving objects are separated from the video image (this will be referred to as a portional background image hereinafter) similarly to what described above. Then the separated portional background image is compared with the maximum picture frame stored in the buffer memory to discriminate which part of the maximum picture frame background image of the portional background image is. In this case, when the size of the picture frame of the portional background image is ⅓ of the maximum picture frame (i.e. the picture frame at the most telescopic side is ⅓ of that of the most wide angle side), pixels of the portional background image are culled out to ⅓ in the vertical and horizontal directions to compare with the maximum picture frame background image to implement a pattern matching.

Figure 18:
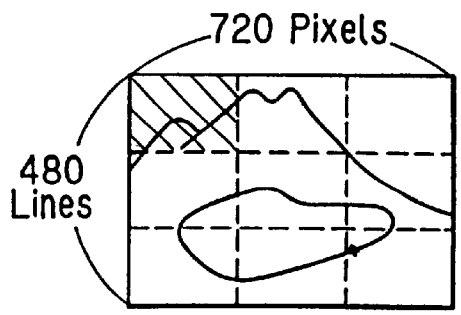
FIG. 18 is a drawing showing one example of the background image.

Now, if a shot portional background image section is recognized to be an image at the upper left corner of the maximum picture frame shown by slanted lines in FIG. 18 for example by the pattern matching, the portional background image section is written into a corresponding portional screen address of the background plane memory 23BG shown by slanted lines in FIG. 17. At this time, what is written into is not the culled image data but the original image data.

Then the signal processing circuit 22 stores the position of the portional background image whose writing has been finished among the still images of the maximum picture frame in FIG. 18 to be written into the background plane memory 23BG.

Next, keeping the zoom lens at the most telescopic side, other portional background image in the maximum picture frame are shot. The signal processing circuit 22 checks which part of the maximum picture frame the portional background image is similarly to what described above and writes the background sections which have not been written into the background plane memory 23BG yet at corresponding address positions in the background plane memory 23BG.

Such process is carried out until all the background images in the maximum picture frame are written into the background plane memory 23BG. When the maximum picture frame has been written, the unit notices that by beeping for example.

The still images of the moving objects such as the airplane, monkey and vehicle separated by being recognized respectively as moving objects during filming at the most telescopic side are written into the motion plane memories 23A1 through 23An (n: natural number) respectively when the maximum picture frame stationary background image is registered to the background plane memory 23BG.

Image data of each still image separated into the background plane and the plurality of motion plane and written into the plane memories 23BG and 23A1 through 23An as described above is recorded into the disk 11 beforehand in the preliminary period shown in FIG. 3 before actually starting to shoot and record by the video camera.

In this example, for the background plane, the position of the picture frame of the background image separated in filming and recording on the background plane memory 23BG is included in the motion change information as a change information (hereinafter referred to as picture frame position information) indicating the picture frame position based on the position of the picture frame of the background image when actual filming and recording is started on the background plane memory 23BG. Then the motion change information and picture frame position information generated as described above are recorded into the disk 11 on real-time.

To that end, the signal processing circuit 22 finds the motion change information of moving object in each motion plane and the picture frame of the background image from the input digital image signal using the background plane and n motion plane data separated during the shooting and recording mode. Then it supplies the motion change information and picture frame position information to the compressive coding circuit 26 to compress and code at an adequate compression ratio to complete a motion plane memory of one moving object via the record processing circuit 25.

By the way, even if two moving objects overlap at a given point of time, the moving objects may be observed to be separated as a predetermined time passes by, so that the aforementioned method allows each motion plane memory to accumulate motion plane data representative of only each moving object by rewriting the motion plane memory as necessary.

Figure 19:
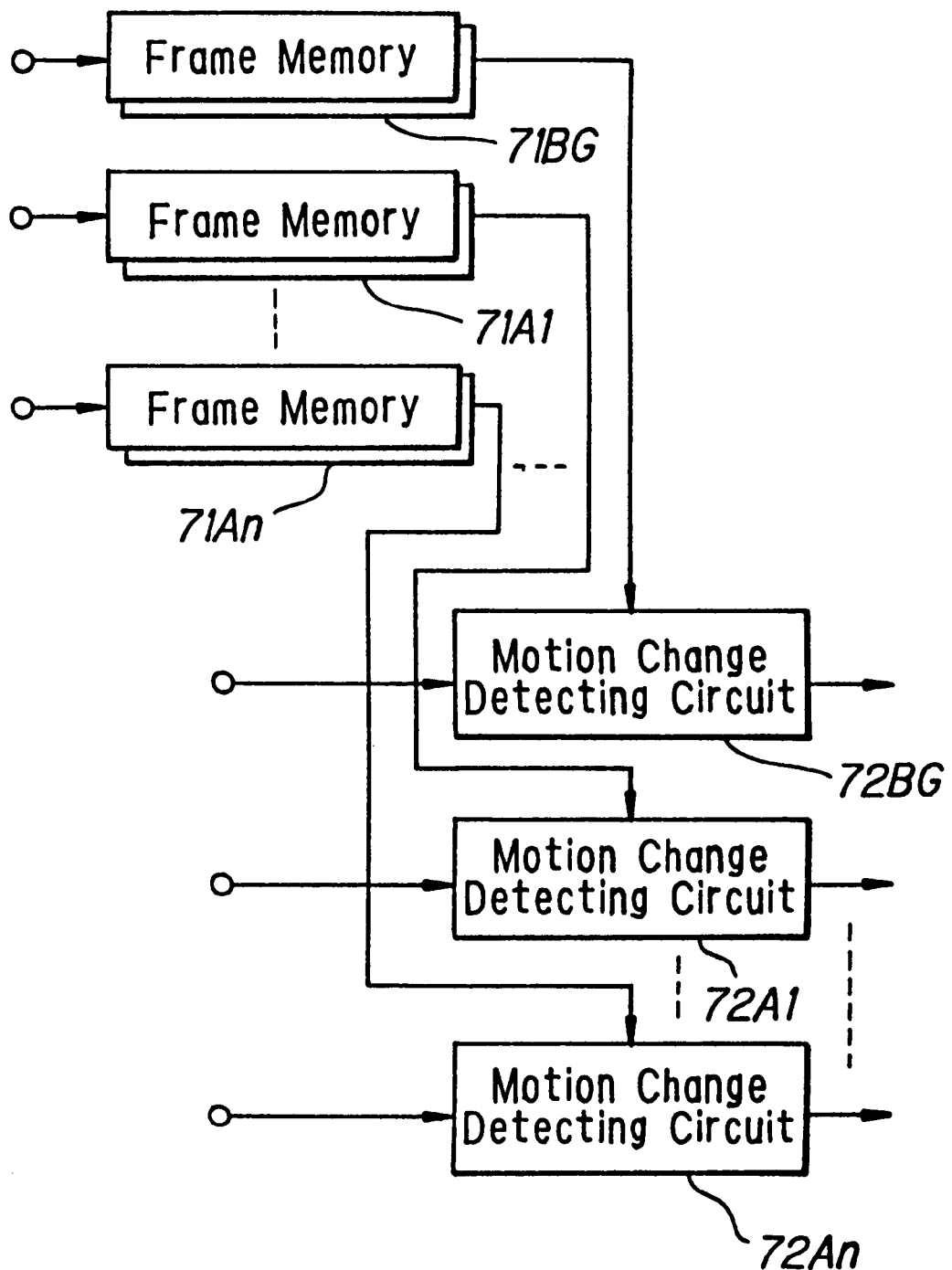
FIG. 19 is a block diagram showing one embodiment of the motion change information detecting circuit 31 of the present invention.

Referring now to FIG. 19, a structural example of a circuit for generating the picture frame position information of the background image on the background plane and the motion change information of each moving object in the signal processing circuit 22 will be explained.

The picture frame position information and motion change information are generated from the present image data using the data in the background plane memory 23BG and the motion plane memories 23A1 through 23An. The circuit shown in FIG. 19 starts to operate when the shooting and recording start key is manipulated after the preliminary period described above is past. That is, the picture frame position information and motion change information are recorded on real-time in this example.

That is, the video data from the A/D converter 21 is separated into the background plane data of one screen and plane data of each moving objects by the plane separating circuit in the signal processing circuit 22 as described before. Then one frame of information of the background image and each moving object are written into the frame memories 71BG and 71A1 through 71An. These frame memories 71BG and 71A1 through 71An are comprised of two frame buffers wherein when data on the background image and moving object is written into one frame memory, data on the background plane motion plane is read from another frame memory to use the data to generate the picture frame position information and motion change information.

That is, data of background image from the frame memory 71BG is supplied to a picture frame position change detecting circuit 73BG and image data of each moving object from the frame memories 71A1 through 71An is supplied to motion change detecting circuits 72A1 through 72An. And the maximum picture frame background data from the background plane memory 23BG is supplied to the picture frame position change detecting circuit 72BG and the motion plane data stored in the motion plane memories 23A1 through 23An during the preliminary period is supplied to the motion change detecting circuits 72A1 through 72An.

In the picture frame position change detecting circuit 72BG, the maximum picture frame background image and the background image from the frame memory 71BG are compared to detect the picture frame position of the background image from the frame memory 71Bg on the maximum picture frame background image and to detect a change from the initial position to output its change information as picture frame position information which is supplied to the compressive coding circuit 26.

The motion change detecting circuits 72A1 through 72An find a motion vector of the moving object, i.e. a direction and degree of the motion, by matching patterns of the moving object stored in each of the motion plane memories 23A1 through 23An and each of the dynamic images from the frame memories 71A1 through 71An.

When the moving object changes its direction or its shape, an error becomes significant in the pattern matching. Then the error is also transmitted as motion change information together with the motion vector in the present embodiment.

The data of the motion vector and matching error of the moving object in each motion plane memory thus obtained by the motion change detecting circuit 72A1 through 72An are supplied to the compressive coding circuit 26.

The compressive coding circuit 26 compresses the input data. As described before, the data amount after the compression is very small as compare to video information, allowing to readily record in the disk on real-time.

By the way, when the camera is zoomed, the zoom ratio information is included in the change information and the data of the background plane and motion plane are made to go through a low pass filter (culling of data) corresponding to the zoom ratio in order to compare with the video signal. When the filmed background protrudes from the background plane memory 23BG, a difference with the background plane is recorded together with the picture frame information.

By the way, instead of the picture frame position information of the background plane, sensor means for detecting a moving direction and distance of the camera when it is moved by tilting or panning from a set position of the initial background image may be provided to record the information on the moving direction and distance detected by the sensor means.

Further, as the motion change information of the moving object, the predicted motion vector and object deformation information as shown in FIG. 13 may be transmitted.

A-Now another embodiment of the present invention will be explained.

In the present embodiment, the still image data of the background plane is not recorded as it is. Rather, an approximate still image of the background plane is created from typical image data of an image element which is assumed to constitute natural things, buildings, structures, living things and others prepared beforehand and information for discriminating the image element constituting the approximate still image and information on the screen position are recorded instead of recording the image data.

Then a difference between the approximate still image and the correct background still image is recorded by including in the change information of the background. The change information of the background includes the background image data which changes when the filming picture frame is changed by panning, tilting or zooming by the video camera section 1.

The moving part is separated into each moving object which is registered in each of the motion plane memories 23A1 through 23An to record the still image data of the moving object and to record change information of the moving object in each motion plane. The still image data of the motion plane is also replaced with the approximate still image similarly to the background image and its discrimination information is recorded in this case.

And for the moving part, a difference between the approximate still image and the still image of each moving object, a moving direction and distance of the moving object and changes of image corresponding to the move are recorded as the change information on the moving part.

Figure 20:
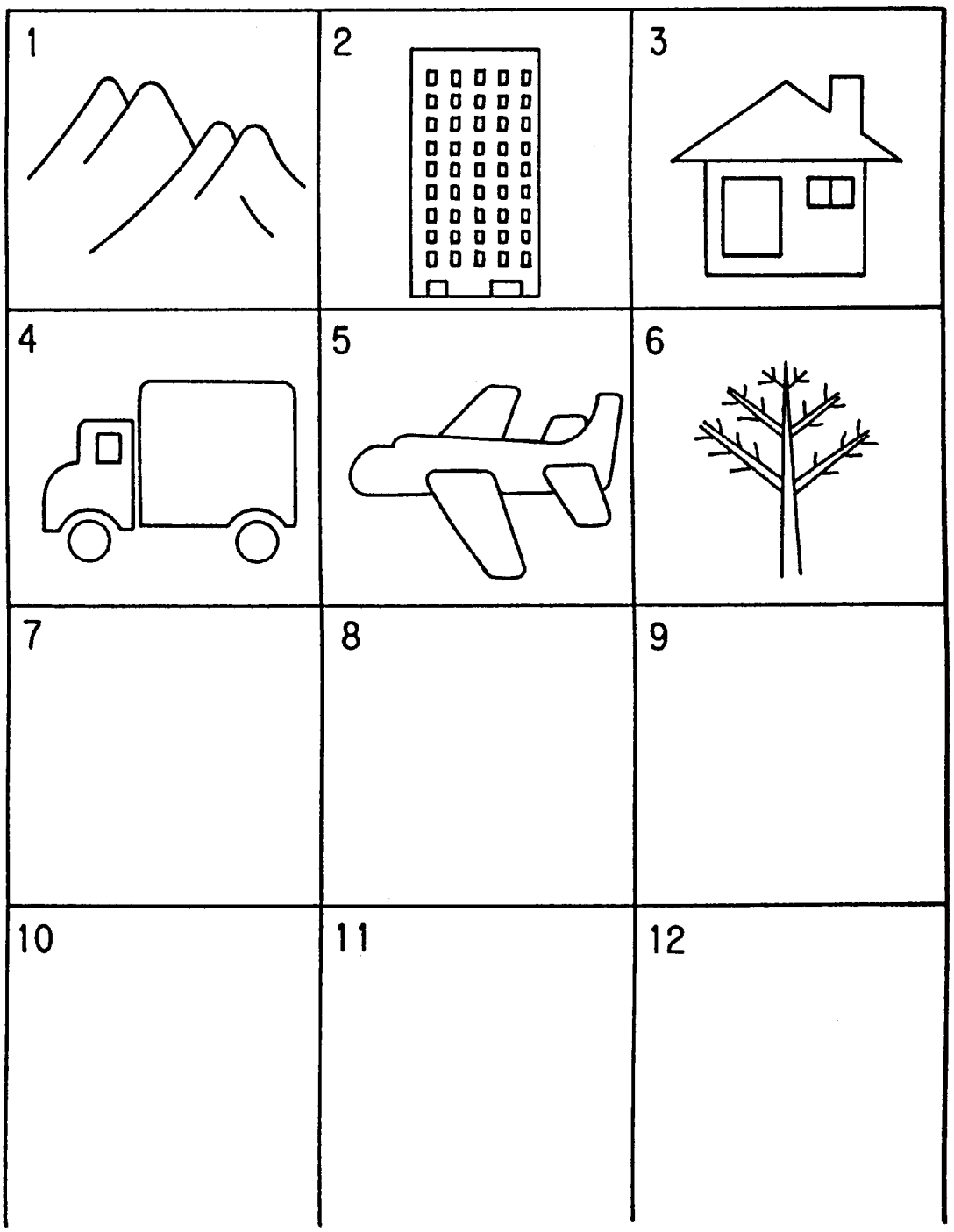
FIG. 20 is a drawing for explaining proximate background still image data and proximate moving object still image data of the present invention.

A large number of typical image data of the image elements which are assumed to constitute images of the natural things, buildings, structures, living things and others are stored in the image element memory 5 as shown in FIG. 20 for example. The images of the image elements stored in the image element memory 5 include those provided as standard which have been prepared beforehand and those which the user filmed and stored.

However, any of the image elements may be read out by the discrimination information added corresponding to the addresses in FIG. 5. For example, a number is given to each image element which allows to discriminate and read in the example in FIG. 20.

Figure 21:
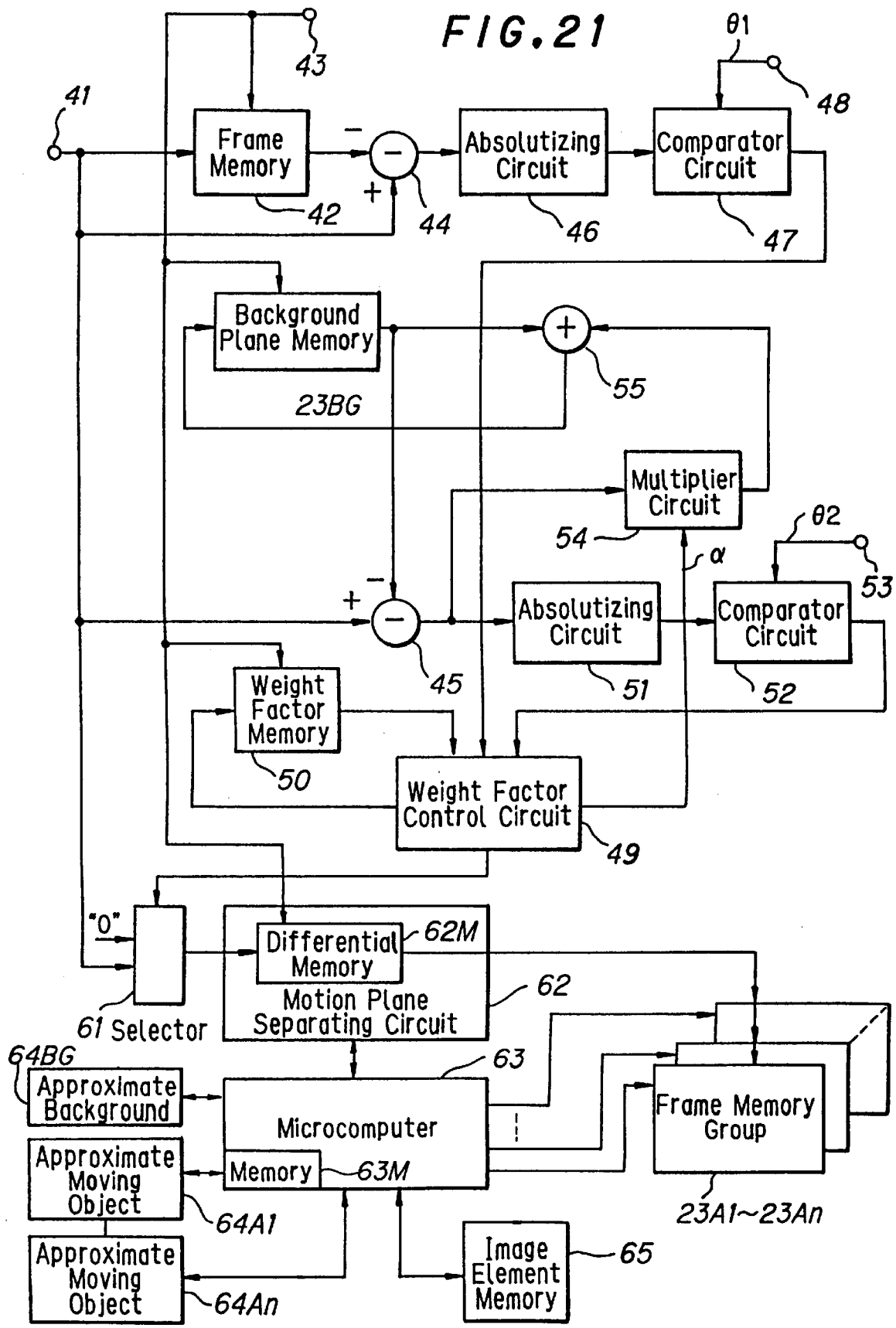
FIG. 21 is a block diagram of another embodiment of the signal processing circuit 22 of the present invention.

Referring now to FIG. 21, a concrete embodiment of the signal processing circuit 22 of this case will be explained.

In this example, the signal processing circuit 22 separates the input image signal into the still images of the background plane and motion plane in the preliminary period and writes them into the background plane memory 23BG and the motion plane memories 23A1 through 23An. Further, it generates approximate still images from the still images in the memories 23BG, and 23A1 through 23An using the image elements in the image element memory 5.

The signal processing circuit 22 writes the separated background plane into the background plane memory 23BG. It also writes the separated n motion planes into respective 23a (n: natural number). Because the concrete embodiment for separating the background plane and motion planes described above is the same with the embodiment shown in FIG. 5, its explanation is omitted here.

When the still images of the background plane and motion planes are separated from the input image signal and are stored in the memories 23BG and 23A1 through 23An, the signal processing circuit 22 replaces those still images with image elements in an image element memory 65 to generate respective approximate still images.

That is, the signal processing circuit 22 creates an approximate still image of the background still image in the background plane memory 23BG at first. There are several methods for implementing that. For example, one image element is read out of the image element memory 65 to compare and search the image element with each part of the still image in the memory 23BG. When a comparison error is smaller than a threshold value, the still image section is replaced with said image element. At this time, a position of the replaced still image section on the screen is stored.

For each image element in the image element memory 65, a magnified image of the typical image of the image element is stored in a relatively high definition. When it is read out of the image element memory 65, the size can be specified so that it conforms to a size of a corresponding portion of the background image to be replaced. That is, when it is read in a state larger than the stored image, it is read while interposing data and when it is read in a state smaller than the stored image, data is culled out to adjust the size.

In this case, the image element to be read out of the image element memory 65 and to be replaced with the background plane may be selected and specified by the number in this case by scrolling all the image elements in the image element memory 65 on the view finder (not shown) of the camera section 1 for example. It is also possible to implement the search of all the image elements described above automatically.

The approximate background still image thus produced is written into an approximate background plane memory 64BG.

Also for the still image of the moving object in each of the motion plane memories 23A1 through 23An, an approximate moving object still image is produced using the image elements in the image element memory 65 and its approximate still image data is written into approximate motion plane memories 64A1 through 64An.

When the approximate still image is produced and is written into the approximate plane memories 64BG and 64A1 through 64An as described above, the compressing circuit 24 implements a process for creating recording information of the discrimination information, e.g. the discrimination number in this example, of the image elements composing the approximate still image and of information which indicates a position on the screen occupied by the image element, instead of the recording information of the image data of the approximate still image. By the way, in the case of the approximate moving object still image, because the position information on the screen may be recorded including in the change information when the image data of the still image of said moving object is transmitted, it needs not be included in the recording information in this preliminary period.

The recording information on the still image from the compressing circuit 24 is supplied to the record processing circuit 25. An output data of the record processing circuit 25 is supplied sequentially to the magnetic head 13 for recording via the head driving circuit 27 to record on the a disk 11 magneto-optically.

In this example, the signal processing circuit 22 separates the video signal into the still images of the background image and each moving object at first similarly in the preliminary period described above even during the filming and recording period after the shooting and recording start key has been actually manipulated at the video camera section 1. Then the separated still images are compared with the approximate background still image and approximate moving object still image data registered in the approximate background plane memory 64BG and each of the approximate motion plane memories 64A1 through 64An to produce the change information as described above.

Still another embodiment of the present invention will be explained.

Figure 22:
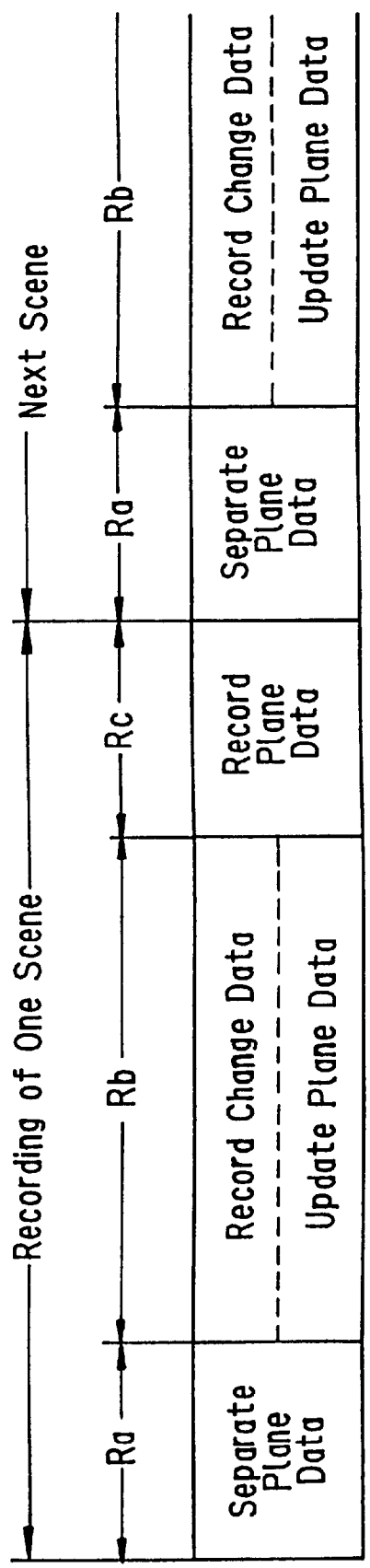
FIG. 22 is a diagram for explaining a timing of signal recording of the present invention.

In the present embodiment, one scene is recorded by separating into a period for separating the plane data of still images Ra, period for generating and recording the change information and for renewing the plane data Rb and a period for recording the plane data Rc as shown in FIG. 22.

No plane data is recorded in the separating period Ra. Rather, the plane data is separated and the separated plane data is written into the plane memories 23BG and 23A1 through 23An, as described later.

In the period Rb, the change information is produced from the plane data in the plane memories 23BG and 23A1 through 23An and the input image signal and is recorded. In the same time, the plane data in each of the memories 23BG and 23A1 through 23An is renewed using the change information.

The period Rc is a period after the termination of the image signal of one scene. That is, the change information is recorded almost on real-time corresponding to the input image signal during the period Rb. Then each plane data after the renewal stored in the plane memories is recorded after finishing to record the change information. Because this period Rc is a period after the real-time recording of the input signal, the recording may be carried out taking a sufficient time. Owing to that, the plane data may be recorded without compressing or with a low compression ratio.

Figure 23:
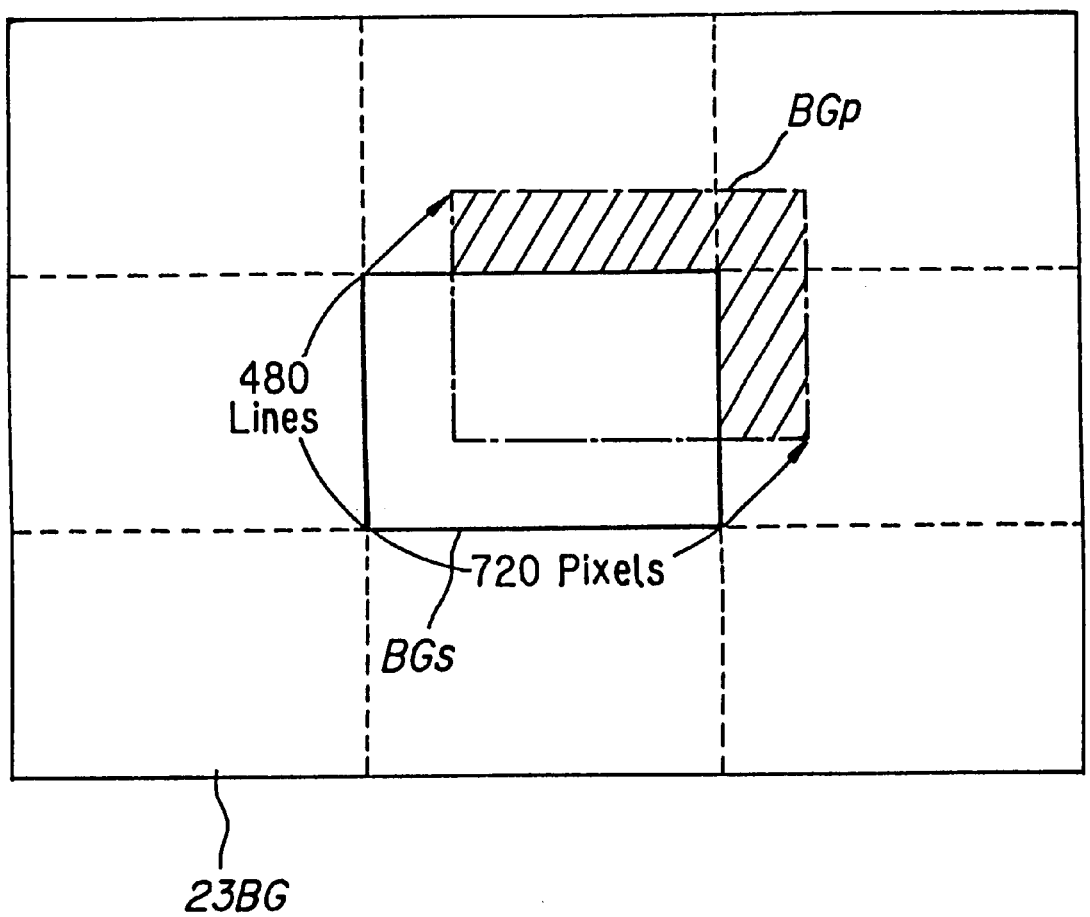
FIG. 23 is a diagram showing the storage capacity of background plane.

In this case, the plane data of one screen is composed of 480×720 pixels for example as shown in FIG. 4. In the case of this example, the motion plane memories 23A1 through 23An may be constructed by memories having a capacity permitting to write the one screen of still image data. However, considering panning, tilting and zooming of the camera, the background plane memory 23BG is constructed by a large capacity memory permitting to store pixel data of more than one screen or a plurality of screens in this example. That is, the background plane memory 23BG is provided with a capacity permitting to write pixel sample data of (480×a) lines in the vertical direction and (720×b) pixels in the horizontal direction as shown in FIG. 23. (a) and (b) are values more than 1.

Because the background plane memory 23BG has such a large capacity as described above, the background image allows the background which comes into the picture frame when the camera shooting picture frame is changed by panning or tilting around the center background image centering on the background image BGs in the picture frame BGs at the center in FIG. 5 for example to be written into the background plane memory 23BG. That is, the background image written in the all areas of the background plane memory 23BG is what has a wide range which is wider a times in the vertical direction and b times in the horizontal direction as compare to the picture frame displayed as one screen.

Due to that, when the background image is written in the whole range of the background plane memory 23BG, even when the camera is zoomed to set at the wide angle at the background image of the picture frame of one screen at the center position, all the background image within the zoom range is written into the background plane memory 23BG provided that the range is within the wide angle range corresponding to the aforementioned values a and b.

In the period Ra, data of the background image of one screen is written at the position of the picture frame BGs at the address almost at the center of the background plane memory 23BG (hereinafter called as the initial background gtplane) as shown in FIG. 23 as described later and one screen of separated and obtained still image of each moving object is written into each of the motion plane memories 23A1 through 23An.

The plane separating and storing operations during this period Ra are the same with those in the aforementioned embodiment, an explanation thereof will be omitted here.

The initial plane data separated as described above has the following problems.

Figure 24A:
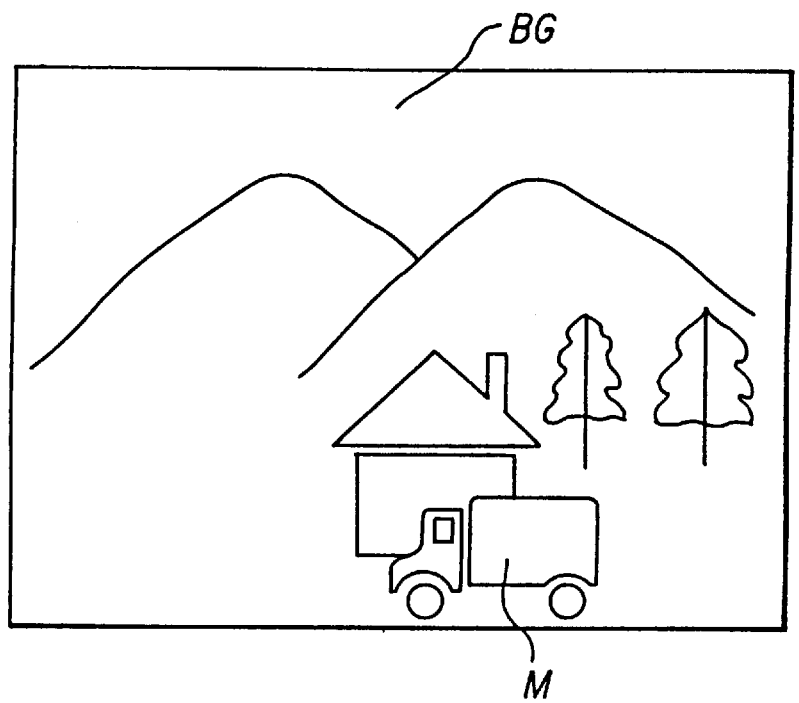
FIGS. 24A and 24B are drawings for explaining one example of the background plane memory 23BG of the present invention.

Considering at first about the background plane BG, a background portion which is hidden by a moving object M at a given point of time appears when the moving object moves away completely from that position as shown in FIG. 24A. However, the period Ra is short as a period for the moving object to completely move out and for the hidden portion to appear, so that a portion of the moving object is included in the initial background plane. This problem may be solved by finding changes of the background that correspond to the changes of motion of the moving object M and by renewing the background plane. Then the contents of the background plane memory BG is rewritten to what is renewed during the next period Rb.

Figure 24B:
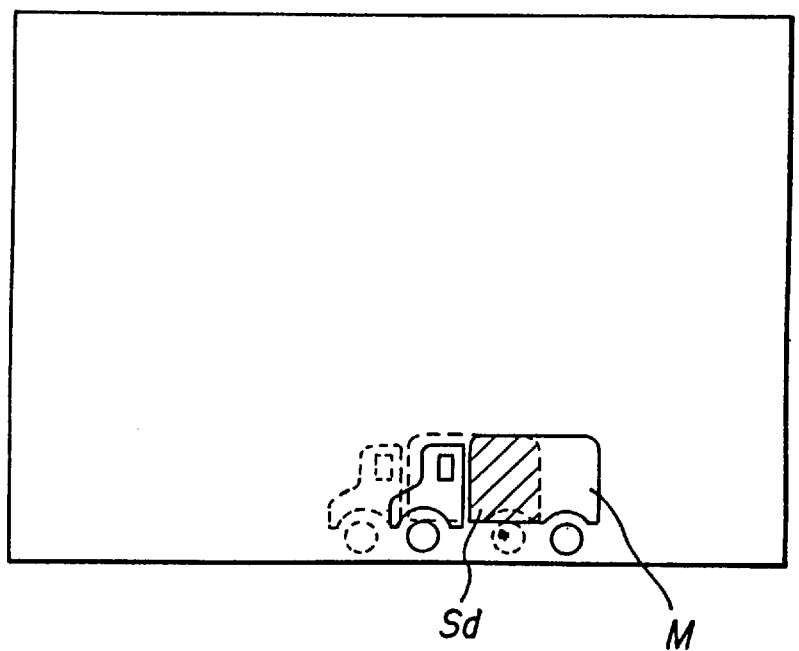

Considering also about the motion plane, the moving object M is separated as sets of motion pixels as described before. Due to that, when its move is slow, a portion whose motion does not appear may be brought about in a micro time. That is, when the moving object M is a vehicle and when it moves slowly from the position of the solid line to that of the broken line during the period Ra as shown in FIG. 24B for example, a portion of a side door sd denoted by slanted lines cannot be captured as a moving part and is captured as a background. However, this problem may be also solved by rewriting the motion planes corresponding to the changes of the moving object. Then the contents of the motion plane is renewed during the next period Rb.

During the period Rb, the signal processing circuit 22 also separates the video signal into the background plane and still image of each moving object at first similarly in the aforementioned period Ra. Then it compares the separated still image with the initial background plane and motion plane data registered in the background plane memory 23BG and each of the motion plane memories 23A1 through 23An to produce change information.

For the background still image, data Vs of a future change direction and variation (direction and degree of panning and tilting and zoom ratio, etc.) and image data ΔPs of the variation of the background still image are produced as change information for the background plane based on the position of the picture frame BGs of the still image of the initial background plane on the background plane memory 23BG. Further, for each moving object, a moving direction and moving distance Vm of each moving object and image data ΔPm which is a difference with the motion plane caused by motion change such as a turn and changes of shape are produced.

Then the change information produced as described above is recorded on the disk 11 on real-time. Thereby the change information of the background image ΔPs and Vs and change information of each moving object ΔPm1 through ΔPmn and Vm1 through Vmn are recorded on the disk 11.

Following to the record, the signal processing circuit 22 finds image data of the variation of the background still image, i.e. a variation within the picture frame BGs, to renew or correct the still image data within the picture frame BGs and to write image data containing an area increased as the background beyond the picture frame BGs by panning and tilting, etc. into the background plane memory 23BG. For example, when the picture frame position changes due to panning, tilting or the like and a portion of background still image filmed turns out to be a still image BGp shown by the dotted line in FIG. 23, image data shown by the slanted lines in FIG. 23 is added to the memory 23BG.

Similarly, the contents of each of the motion plane memories 23A1 through 23An is rewritten from the variation of the motion plane.

Thus the still image data in the background plane memory 23BG and each of the motion plane memories 23A1 through 23An are rewritten and the data of the background plane which is the contents stored in the background plane memory 23BG becomes more adequate than the initial background plane and turns out to be data of background plane having a wider range than one screen.

Then the next change information is produced based on the rewritten plane data. However, the basis for producing the change information of the background is information of one screen at the picture frame position BGs of the initial background plane.

The generating of the aforementioned change information and rewriting of the still image data in the background plane memory 23BG and each of the motion plane memories 23A1 through 23An are carried out before one scene ends.

After finishing the recording of change information of one scene as described above, the still image information in the background plane memory 23BG and each of the motion plane memories 23A1 through 23An sequentially renewed during the period Rb are recorded during the period Rc.

All the background images used in the scene by panning, tilting and zooming are stored in the background plane memory 23BG as described before. However, changed still image information (increased information) of the initial background plane against the still image BGs is recorded on the disk 11 as change information of the background plane.

If the contents of the background plane memory 23BG after finishing the recording is adopted as background plane data here as a basis for fining the change information of the background plane, instead of the initial background plane, it becomes possible to easily create a background still image of each frame at the reproduction side by recording the information indicating the picture frame position in the background plane data as background data of each image frame. By doing so, the image change information of the background plane-needs not be recorded and so much recorded data amount may be reduced. Furthermore, there is no degradation in the reproduced image.

Considering those points described above, the information recorded on the disk 11 is reproduced and recorded again in this example.

That is, as shown in FIG. 25, a re-recording period is provided after the period Rc when the re-recording is to be implemented. At this time, during the period Rc before this re-recording period, the background plane data is separated as information in the background plane memory 23BG after finishing the recording, i.e. as good stationary background image and a still image information BGL of a magnified picture frame is recorded in this example. Further, for the n moving objects after finishing one scene, still image data of each of the motion plane memories 23A1 through 23An which is considered to be adequate is recorded.

During the re-recording period, a recorded signal (change information) is reproduced to reproduce an image by a reproducing unit described later. Then new change information is generated from the reproduced signal and data from the memories 23BG and 23A1 through 23An and is recorded. During the recording thereof, changed position of the initial background plane against the picture frame position BGs is detected and generated and only the information thereof is recorded without recording the change image information ΔPs against the background plane.

That is, information ST of the initial background plane at the picture frame position BGs on the recorded magnified background plane BGL is recorded at first. This may be an address information at the upper left corner of the still image of the magnified background plane on the background plane memory 23BG. Next a picture frame position information FLs after the change found from the information Vs on the picture frame position change direction and variation of the background image of each reproduced frame is recorded as information of the background plane of said frame. This picture frame position information FLs may be also an address information at the upper left corner of said picture frame in the still image on the magnified background plane on the background plane memory 23BG.

If it is arranged so that the picture frame position information of the background image of said frame is found. from the information Vs at the reproduction side, the information Vs of the change direction and variation may be recorded as it is.

As described above, the re-recording eliminates the need to record the information Ps of the variation of image of each frame (or field) for the background image, allowing to reduce the recorded information amount. Further, even it is re-recorded, a quality of the image will not degrade at all, differing from the recording of a copy in a VTR for example.

The recorded data amount may be reduced further similarly by re-recording the change information of the motion planes by renewing based on the renewed plane data.

Further, motion information may be reduced for the moving objects by recording as the still image plane data a plurality of still image data whose image contents differ from each other, not information on the magnified picture frame.

That is, assuming a dynamic image in which a vehicle turns for example, still images of the front view, side view and rear view of the vehicle are prepared as a vehicle plane and a plane number is given to each of them. Then in finding change information on the vehicle in the present image shot and inputted, the recorded data amount as the change information may be reduced by recording plane numbers whose difference (variation) with the vehicle plane is less and its variation.

The picture frame position of the background plane during the reproduction may be changed in the vertical and horizontal directions against the recorded picture frame position information by manipulating a picture frame position changing key in the key group 4 shown in FIG. 16. That is, when the picture frame position changing key is manipulated, the picture frame position is changed in a direction specified by the changing key from the picture frame position defined by the reproduced picture frame position information and the background plane of at the changed picture frame position is read out of the background plane 83BG. That is, the picture frame position of the background plane during the reproduction may be changed to an arbitrary position within the range of the background plane by the picture frame position changing key.

Further, a reproduction zoom key is provided and when it is manipulated, a background image of a magnified or reduced picture frame corresponding to a zoom ratio is read out of the memory 83BG. At this time, the data is interpolated or culled out corresponding to the zoom ratio so that it conforms with data of one screen of 720 pixels×480 lines. Thus the user can enjoy creating a desired graphic at the reproduction side regardless of the picture frame position during the filming.

The dynamic image data from this signal processing circuit 85 is returned to the original analog signal by a D/A converter 86 and is led out of an output terminal 87 to image its reproduced video on an image monitoring unit connected with this output terminal.

As described above, the dynamic image of each scene may be reproduced by reading the background plane and motion plane data per scene at first from the disk and then by reading the motion change information sequentially from the disk. In this case, because the information amount of the motion change information of each scene is very small, a buffer memory may be provided to store the motion change information taken out following to each plane data and to read the motion change information sequentially from the buffer memory corresponding to the dynamic image, not taking out the motion change information of one scene corresponding to the dynamic image on real-time.

In such a case, the dynamic image reproducing process and the extraction of the reproduced signal from the disk can be separated, so that plane data of the next scene may be extracted from the disk and be stored in another plane memory while the previous scene is being reproduced. Thereby, a plurality of scenes may be reproduced continuously without interruption.

According to the present invention, an image is separated into background image and motion planes, is transmitted in high image quality and is composited by transmitting changes of the background image and changes of motion in the motion planes as described above, a high quality and smooth dynamic image may be transmitted even with a transmission medium having a low transmission rate.

For example, conventionally a method so-called MPEG for compressing image data is known. This is a recording method in which image data of one frame (still image) is sent at first and after that, a difference between the first image is taken to compress and transmit a residual thereof. In the MPEG, a number of bits of the first image data of one frame is set at 400 Kbits for example at the data compressed stage. This 400 Kbits image is a relatively good quality image.

This 400 Kbits image is one frame data and when it is expressed in terms of bps, it is equivalent to 12 Mbps because one second is composed of 30 frames. Accordingly, a fairly high quality image may be obtained. Although the reproduced image degrades in the MPEG because only residual data is sent as data afterward, the image of the first one frame itself has a good quality.

Contrary to that, according to the construction of the present invention, data of the plurality-of image planes of the background plane and motion planes are transmitted as image data equivalent to 12 Mbps which is equal to the MPEG and the dynamic image is reproduced by moving such good quality motion planes and compositing with the background plane based on the motion change information transmitted with a small number of bits, so that the image quality is good and the motion is also good, not awkward, because the data of the motion vector is real-time data.

By the way, the present invention may be applied to an unit which records the motion data separated from the background plane not by separating into the plurality of motion planes composed of still images of the moving objects as described above but by compressing motion data containing the plurality of moving objects and separating it from the background plane.

Although the magneto-optic disk has been used as a transmission medium of the video data in the example described above, it is needless to say that a tape and other recording medium may be used in the present invention.

While preferred embodiments of the present invention have been described using specific terms, such description is for illustrative purposes only, and it is to be understood that changes and variations may be made without departing from the spirit or scope of the following claims.

What is claimed is:

1. An apparatus for transmitting digital video data having a plurality of N×M images, said digital video data including a background and at least one motion object, said apparatus comprising:

a separating circuit for separating an N×M image of said digital video data into a plurality of N×M planes thereby generating background data representing an N×M background plane and motion data representing at least one N×M motion object plane of said at least one motion object, each of said at least one motion object plane representing a location of said at least one motion object in said N×M image, wherein each N×M plane comprises a different component image of said N×M image;

an encoding circuit for encoding the background data and the motion data; and a transmitting circuit for transmitting the encoded background and motion data encoded by said encoding circuit.

2. An apparatus according to claim 1, wherein said at least one motion data comprises one still image of the motion object and motion changing information of the motion object between the images; and said circuit for encoding includes means for encoding the one still image of the motion object and means for encoding the motion changing information of the object.

3. The apparatus according to claim 2 wherein, said background of a k-th image of said plurality of images is determined from pixel data of a previous image background and input digital video data of said k-th image.

4. An apparatus according to claim 2, wherein said separating circuit includes a motion memory for storing the one still image of the motion object; and said apparatus further comprises: a circuit for detecting the motion changing information representative of a difference between the one still image of the motion object stored in the motion memory and an image of motion object of a present image of the digital video data.

5. An apparatus according to claim 4, wherein the motion changing information includes position information to indicate a position on the background.

6. The apparatus according to claim 1 wherein, said background of a k-th image of said plurality of images is determined from pixel data of a previous image background and input digital video data of said k-th image.

7. An apparatus for receiving digital video data including encoded background data representing an N×M background plane and encoded motion data representing at least one N×M motion object plane, each of said at least one motion object plane representing a location of a corresponding motion object in an N×M image, said apparatus comprising:

a receiver for receiving the encoded background data and encoded motion data;

a decoder for decoding the encoded background data and the encoded motion data to produce decoded background data and decoded motion data; and a circuit for combining the N×M planes of the decoded background data and the decoded motion data and producing digital video data to be outputted.

8. An apparatus according to claim 7, wherein: said at least one motion data comprises one still image of the motion object and motion changing information of the motion object between the images; and said circuit for combining the decoded background data and the at least one decoded motion data is operable on the basis of said motion changing information of the motion object.

9. The apparatus according to claim 8 wherein, said background of a k-th image of said plurality of images is determined from pixel data of a previous image background and input digital video data of said k-th image.

10. An apparatus according to claim 8, wherein the motion changing information includes position information to indicate a position on the background.

11. The apparatus according to claim 7 wherein, said background of a k-th image of said plurality of images is determined from pixel data of a previous image background and input digital video data of said k-th image.

12. A method for transmitting digital video data representing an N×M image including an N×M background plane and at least one N×M motion object plane, each of said at least one motion object plane representing a location of a corresponding motion object in said N×M image, said method comprising the steps of:
separating the digital video data into said N×M background plane and said at least one N×M motion object plane;
encoding background data of said N×M background plane and motion data of said at least one N×M motion object plane; and
transmitting the encoded background and motion data.

13. A method according to claim 12, wherein said at least one motion data includes one still image of the motion object and motion changing information of the motion object between the images, and wherein said step of encoding encodes the one still image of the motion object and the motion changing information of the object.

14. The method according to claim 13 wherein, said background of a k-th image of said plurality of images is determined from pixel data of a previous image background and input digital video data of said k-th image.

15. A method according to claim 13, wherein said step of separating stores the one still image of the motion object in a motion memory; and method further comprising the step of: detecting the motion changing information representative of a difference between the one still image of the motion object stored in the motion memory and an image of the motion object of a present image of the digital video data.

16. A method according to claim 15, wherein the motion changing information includes position information to indicate a position on the background.

17. The method according to claim 12 wherein, said background of a k-th image of said plurality of images is determined from pixel data of a previous image background and input digital video data of said k-th image.

18. A method for receiving an N×M video image including an N×M background plane represented by encoded background data and at least one N×M motion object image represented by encoded motion data generated by encoding digital video data of said N×M video image, each of said at least one N×M motion object image representing a location of a corresponding motion object in said N×M video inshape, said method comprising the steps of:
receiving the encoded background data and the encoded motion data; decoding the encoded background data and the encoded motion data to produce decoded background data and decoded motion data; and
combining the decoded background data and the decoded motion data and producing digital video data to be outputted.

19. A method according to claim 18, wherein said at least one motion data includes one still image of the motion object and motion changing information of the motion object between the images, said step of combining combines the decoded background data and the at least one decoded motion data on the basis of said motion changing information of the motion object.

20. The method according to claim 19 wherein, said background of a k-th image of said plurality of images is determined from pixel data of a previous image background and input digital video data of said k-th image.

21. A method according to claim 19, wherein the motion changing information includes position information to indicate a position on the background.

22. The method according to claim 18 wherein, said background of a k-th image of said plurality of images is determined from pixel data of a previous image background and input digital video data of said k-th image.

23. An apparatus for transmitting an N×M video image in the form of digital video data comprising a sequence of images, comprising:
a plane data generating circuit for generating plane data including background plane data representing an N×M background image of the N×M video image and n sets of motion object plane data, n being an integer (n=1, 2,3), wherein each of the n sets of motion object plane data represents plane data of a corresponding N×M motion object image of the N×M video image, each N×M motion object image representing a location of a corresponding motion object in the N×M video image, wherein said plane data generating circuit generates the plane data using several images of the digital video data; and
a transmitting circuit for transmitting the background plane data and the n sets of motion plane data.

24. The apparatus according to claim 23, wherein the background plane data represents a still image for the background image of the digital video data and each of the n sets of motion object plane data represents a still image for the corresponding motion object image of the digital video data.

25. The apparatus according to claim 23, wherein said plane data generating circuit generates the background plane data and the n sets of motion object plane data by detecting motion between the several images in a temporal direction.

26. The apparatus according to claim 23, wherein said transmitting circuit transmits data indicating overlap information representing overlap in depth direction of images of different plane data.

27. The apparatus according to claim 23, further comprising a compressing circuit for compressing the background plane data and the n sets of motion object plane data to generate compressed background plane data and compressed n sets of motion object plane data.

28. The apparatus according to claim 23, further comprising a memory for storing the background plane data having a wider range of image than that of an image of said digital video data to be displayed.

29. The apparatus according to claim 23, wherein said transmitting circuit transmits the background plane data having a wider range of image and position information indicating a position of said background image to be displayed on the background plane data having a wider range of image.

30. The apparatus according to claim 23, further comprising:
a detecting circuit for detecting background plane change information representing a change between background images in a temporal direction in accordance with previous background plane data and background plane data of an input image of the digital video data; and
a control circuit for controlling renewal of the background plane data in accordance with the background plane change information.

31. The apparatus according to claim 30, wherein said transmitting circuit transmits the renewed background plane data as the background image.

32. The apparatus according to claim 30, wherein said control circuit recreates the background plane change information in accordance with the renewed background plane data.

33. The apparatus according to claim 23, further comprising:
   a detecting circuit for detecting motion plane change information representing a motion change between the motion object images in a temporal direction for each of the n sets motion object plane data; and
   a control circuit for controlling renewal of the n sets of motion object plane data in accordance with the motion plane change information.

34. The apparatus according to claim 33, wherein said transmitting circuit transmits the renewed n sets of motion object plane data as motion objects and the motion plane change information.

35. The apparatus according to claim 23, further comprising a detecting circuit for detecting motion object plane change information of an inputted image of the digital video data in a temporal direction for each of the n sets of motion object plane data; wherein said transmitting circuit transmits said motion object plane change information.

36. The apparatus according to claim 35, further comprising a first encoding circuit for encoding the motion object plane change information for each of the n sets of motion object plane data to generate the encoded motion plane change information.

37. The apparatus according to claim 36, further comprising a second encoding circuit for encoding the background plane data and the n sets of motion object plane data and generating the encoded background plane data and the encoded n sets of motion object plane data.

38. The apparatus according to claim 37, wherein said second encoding circuit encodes the background plane data and the n sets of motion object plane data at a compression efficiency lower than that of said first encoding circuit.

39. The apparatus according to claim 35, wherein said detecting circuit detects background change information representing a change between the background images in a temporal direction in accordance with previous background plane data and an input image of the digital video data; and further comprising a control circuit for controlling renewal of background plane data in accordance with the background change information such that said background plane data has a wider range of image than that of an image of the digital video data to be displayed.

40. The apparatus according to claim 39, wherein said control circuit recreates the background change information in accordance with the renewed background plane data.

41. An apparatus for receiving transmitted data and reproducing digital video data comprising a sequence of N×M images, comprising:
   a receiving circuit for receiving background plane data representing an N×M background image of a particular N×M image of the digital video data and n sets of motion object plane data, n being an integer (n=1,2,3), wherein each of said n sets of motion object plane data represents a corresponding N×M motion object image of the particular N×M image, each N×M motion object image representing a location of a corresponding motion object in the particular N×M image; and
   a reproducing circuit for reproducing the digital image data in accordance with the background plane data and the n sets of motion object plane data.

42. The apparatus according to claim 41, wherein the background plane data represents a still image for the background image of the digital video data and each of the n sets of the motion plane data represents a still image for the corresponding motion object image of the digital video data.

43. The apparatus according to claim 41, wherein the transmitted data includes overlap information indicating an overlap in depth direction of plane data; and wherein said reproducing circuit reproduces the digital video data in accordance with the images of different overlap information.

44. The apparatus according to claim 41, wherein the background plane data and each of the n sets of motion object plane data are encoded respectively; the apparatus further comprising a decoding circuit for decoding the encoded background plane data and the encoded n sets of motion object plane data to generate the background plane data and the n sets of motion object plane data.

45. The apparatus according to claim 41, wherein the transmitted background plane data has a wider range of image than that of the digital video data to be displayed.

46. The apparatus according to claim 41, wherein said receiving circuit receives motion object plane change information of an input image of the digital video data in a temporal direction for each of the n sets of motion object plane data; wherein said reproducing circuit reproduces the digital video data in accordance with the motion object plane change information.

47. The apparatus according to claim 46, wherein the motion object plane change information is encoded motion object plane change information; the apparatus further comprising a first decoding circuit for decoding the encoded motion object plane change information to generate the motion object plane change information for each of the n sets one of the motion object plane data.

48. The apparatus according to claim 47, wherein the background plane data and the n sets of motion plane data are encoded background plane data and encoded n sets of motion plane data; further comprising a second decoding circuit for decoding the encoded background plane data and the encoded n sets of motion object plane data.

49. The apparatus according to claim 48, wherein the encoded background plane data and the encoded n sets of motion plane data are encoded at a compression efficiency lower than that of the encoded motion object plane change information.

50. An apparatus for transmitting digital video data comprising a sequence of images, comprising:
   a plane data generating circuit for generating background plane data representing an N×M background image of the digital video data and n sets of motion object plane data, n being an integer (n=1,2,3), wherein each of the n sets of motion object plane data represents plane data of a corresponding N×M motion object image of the digital video data, wherein said plane data generating circuit generates each plane data using several images of the digital video data;
   a typical image memory for storing a plurality of image data which is typically displayed;
   a detecting circuit for detecting background difference information and n sets of motion object difference information, wherein the background difference information represents a difference between previous background plane data and selected background image data which most resembles the previous background plane among the typical image data stored in the typical image memory, wherein each of the n sets of motion object difference information represents a difference between the corresponding motion object plane data and a corresponding selected motion image data which most resembles the motion object plane among the typical image data stored in the typical image memory; and
   a transmitting circuit for transmitting discrimination data corresponding to the selected typical background image data and the selected n sets of typical motion object data, the background difference information and the n sets of the motion object difference information.

51. The apparatus according to claim 50, wherein the typical background image data is image data having a wider range of image than that of an image of digital video data to be displayed;

wherein the transmitting circuit transmits position information indicating a position of the background plane on the image data having a wider range of image.

52. The apparatus according to claim 50, wherein said transmitting circuit transmits data indicating overlap information representing an overlap in depth direction of the plane data.

53. The apparatus according to claim 50, wherein said detecting circuit detects motion object plane change information of an inputted image of the digital video data in a temporal direction for each of the n sets of motion object plane data; and said transmitting circuit transmits discrimination data corresponding to the motion object plane change information.

54. An apparatus for receiving transmitted data and reproducing digital video data comprising a sequence of images, comprising:

a receiving circuit for receiving discrimination data corresponding to selected typical background image data and selected n sets of typical motion object data to be displayed, background difference information and n sets of motion object difference information, n being an integer (n=1,2,3), wherein the background difference information represents a difference between an N×M background plane data and the selected typical background image data, wherein each of the n sets of motion object difference information represents a difference between the corresponding N×M motion object plane data and the corresponding selected typical motion object image data; and a reproducing circuit for generating background plane data and n sets of motion object plane data in accordance with the selected typical background image data and the selected n sets of typical motion data corresponding to the discrimination data and the background difference information and the n sets of motion object difference information and for reproducing the digital image data in accordance with the background plane data and the n sets of motion object plane data.

55. The apparatus according to claim 54, wherein the transmitting data includes overlap information indicating an overlap in a depth direction of the plane data; and said reproducing circuit reproduces the digital video signal in accordance with the overlap information.

56. The apparatus according to claim 54, wherein said receiving circuit receives discrimination data corresponding to motion object plane change information, wherein the motion object plane change information represents a motion change between the images of the digital image data in a temporal direction for each of the n sets of motion object plane data; and said reproducing circuit reproduces, in accordance with the background plane data, the n sets of motion object plane data and the motion object plane change information.

57. A recording medium having an N×M video image in the form of digital video data recorded thereon, said recording medium being prepared by the steps of:

generating plane data including background plane data representing an N×M background image of the N×M video image and n sets of motion object plane data, n being an integer (n=1,2,3), wherein each of the n sets of motion object plane data represents a corresponding N×M motion object image of the N×M video image each N×M motion object image representing a location of a corresponding motion object in the N×M video image, wherein said step of generating generates each plane data using several images of the digital video data; and recording the background plane data and the n sets of motion object plane data as recording data on the recording medium.

58. The recording medium of claim 57, wherein said recording medium records motion object plane change information of an inputted image of the digital video data in a temporal direction for each of the n sets of motion object images.

59. A method for transmitting digital video data comprising a sequence of N×M images, comprising the steps of:

generating plane data including background plane data representing an N×M background image of a particular N×M image of the digital video data and n sets of motion object plane data, n being an integer (n=1,2,3), wherein each of the n sets of motion object plane data represents a corresponding N×M motion object image of said particular N×M image of the digital video data, each N×M motion object image representing a location of a corresponding motion object in said particular N×M image, and said step of generating plane data generates plane data using several images of the digital video data; and transmitting the background plane data and the n sets of motion object plane data.

60. The method according to claim 59, wherein the background plane data represents a still image for the background image of the digital video data and each of the n sets of motion object plane data represents a still image for the corresponding motion object image of the digital video data.

61. The method according to claim 59, wherein said step of generating plane data generates the background plane data and the n sets of motion object plane data by detecting motion between several images in a temporal direction.

62. The method according to claim 59, wherein said step of transmitting transmits data indicating overlap information representing overlap in depth direction of images of different plane data.

63. The method according to claim 59, further comprising the step of compressing the background plane data and the n sets of motion object plane data to generate compressed background plane data and compressed n sets of motion object plane data.

64. The method according to claim 59, further comprising the step of storing the background plane data having a wider range of image than that of an image of said digital video data to be displayed.

65. The method according to claim 64, wherein said step of transmitting transmits the background plane data having a wider range of image and position information indicating a position of said background image to be displayed on the background plane data having a wider range of image.

66. The method according to claim 59, further comprising the steps of:

detecting background plane change information representing a change between background images in a temporal direction in accordance with previous background plane data and background plane data of an input image of the digital video data; and controlling renewal of the background plane data in accordance with the background plane change information.

67. The method according to claim 66, wherein said step of transmitting transmits the renewed background plane data as the background image.

68. The method according to claim 59, further comprising the steps of:
detecting motion plane change information representing a motion change between the motion object images in a temporal direction for each of the n sets motion object plane data; and
controlling renewal of the n sets of motion object plane data in accordance with the motion plane change information.

69. The method according to claim 68, wherein said step of transmitting transmits the renewed n sets of motion object plane data as motion objects and the motion object plane change information.

70. The method according to claim 69, wherein said step of controlling renewal of the n sets of motion object plane data recreates the background plane change information in accordance with the renewed background plane data.

71. The method according to claim 59, further comprising the step of detecting motion object plane change information of an inputted image of the digital video data in a temporal direction for each of the n sets of motion object plane data; wherein said step of transmitting transmits said motion object plane change information.

72. The method according to claim 71, further comprising the step of encoding the motion object plane change information for each of the n sets of motion object plane data.

73. The method according to claim 72, further comprising the step of encoding the background plane data and the n sets of motion object plane data.

74. The method according to claim 73, wherein the step of encoding encodes the background plane data and the n sets of motion object plane data at a compression efficiency lower than that at which said motion object plane change information is encoded.

75. The method according to claim 72, further comprising the steps of detecting background change information representing a change between the background images in a temporal direction in accordance with previous background plane data and an input image of the digital video data; and controlling renewal of background plane data in accordance with the background change information such that said background plane data has a wider range of image than that of an image of the digital video data to be displayed.

76. The method according to claim 75, wherein said step of controlling recreates the background change information in accordance with the renewed background plane data.

77. A method for receiving transmitted data and reproducing digital video data comprising a sequence of N×M images, comprising the steps of:
receiving background plane data representing an N×M background image of a particular N×M image of the digital video data and n sets of motion object plane data, n being an integer (n=1,2,3), wherein each of said n sets of motion object plane data represents a corresponding N×M motion object image of said particular N×M image of the digital video data, each N×M motion object image representing a location of a corresponding motion object in said particular N×M image; and
reproducing the digital video data in accordance with the background plane data and the n sets of motion object plane data.

78. The method according to claim 77, wherein the background plane data represents a still image for the background image of the digital video data and each of the n sets of the motion plane data represents a still image for the corresponding motion object image of the digital video data.

79. The method according to claim 77, wherein the transmitted data includes overlap information indicating an overlap in depth direction of plane data; and said step of reproducing reproduces the digital video data in accordance with the images of different overlap information.

80. The method according to claim 77, wherein the background plane data and each of the n sets of motion object plane data are respectively encoded; further comprising the step of decoding the encoded background plane data and the encoded n sets of motion object plane data to generate the background plane data and the n sets of motion object plane data.

81. The method according to claim 77, wherein the transmitted background plane data has a wider range of image than that of the digital video data to be displayed.

82. The method according to claim 77, wherein said step of receiving receives motion object plane change information of an input image of the digital video data in a temporal direction for each of the n sets of motion object plane data; wherein said step of reproducing reproduces the digital video data in accordance with the motion object plane change information.

83. The method according to claim 82, wherein the motion object plane change information is encoded motion object plane change information; the method further comprising the step of decoding the encoded motion object plane change information to generate the motion object plane change information for each of the n sets of the motion object plane data.

84. The method according to claim 83, further comprising the step of decoding the background plane data and the n sets of motion object plane data.

85. The method according to claim 84, wherein the encoded background plane data and the encoded n sets of motion object plane data are encoded at a compression efficiency lower than that of the encoded motion object plane change information.

86. A method for transmitting digital video data comprising a sequence of images, comprising the steps of:
generating plane data including background plane data representing an N×M background image of the digital video data and n sets of motion object plane data, n being an integer (n=1,2,3), wherein each of the n sets of motion object plane data represents plane data of a corresponding N×M motion object image of the digital video data, and said step of generating plane data generates each plane data using several images of the digital video data;
storing a plurality of image data which is typically displayed;
detecting background difference information and n sets of motion object difference information, wherein the background difference information represents a difference between previous background plane data and selected background image data which most resembles the previous background plane among the typical image data stored, and each of the n sets of motion object difference information represents a difference between the corresponding motion object plane data and a corresponding selected motion image data which most resembles the motion object plane among the typical image data stored in the typical image memory; and transmitting discrimination data corresponding to the typical image data selected as the background plane data and the n sets of motion object plane data, the background difference information and the n sets of the motion object difference information.

87. The method according to claim 86, wherein the typical background image data is image data having a wider range of image than that of an image of digital video data to be displayed; wherein said step of transmitting transmits position information indicating a position of the background plane on the image data having a wider range of image.

88. The method according to claim 86, wherein said step of transmitting transmits data indicating overlap information representing an overlap in depth direction of the plane data.

89. The method according to claim 86, wherein said step of detecting detects motion object plane change information of an inputted image of the digital video data in a temporal direction for each of the n sets of motion object plane data; and said step of transmitting transmits discrimination data corresponding to the motion object plane change information.

90. A method for receiving transmitted data and reproducing digital video data comprising a sequence of images, comprising the steps of:

receiving discrimination data corresponding to selected typical background image data and selected n sets of typical motion object data to be displayed, background difference information and n sets of motion object difference information, n being an integer (n=1,2,3), wherein the background difference information represents a difference between an N×M background plane data and the selected typical background image data, wherein each of the n sets of motion object difference information represents a difference between the corresponding N×M motion object plane data and the corresponding selected typical motion object plane data;

generating background plane data and n sets of motion object plane data in accordance with the selected typical background image data and the selected n sets of typical motion data corresponding to the discrimination data and the background difference information and the n sets of motion object difference information; and reproducing the digital image data in accordance with the background plane data and the n sets of motion object plane data.

91. The method according to claim 90, wherein the transmitted data includes overlap information indicating an overlap in a depth direction of the plane data; and said step of reproducing reproduces the digital video data in accordance with the overlap information.

92. The method according to claim 90, wherein said step of receiving receives discrimination data corresponding to motion object plane change information, wherein the motion object plane change information represents a motion change between the images of the digital image data in a temporal direction for each of the n sets of motion object plane data; and said step of reproducing reproduces, in accordance with the background plane data, the n sets of motion object plane data and the motion object plane change information.

* * * * *